United States Patent
Wright et al.

(10) Patent No.: US 7,585,916 B2
(45) Date of Patent: *Sep. 8, 2009

(54) BLOCK COPOLYMER COMPOSITIONS

(75) Inventors: Kathryn J. Wright, Katy, TX (US);
Carl L. Willis, Houston, TX (US);
Tomomi Nishi, Tsukuba (JP); Norio Masuko, Ami-machi (JP); Dale L. Handlin, Jr., Houston, TX (US); Robert C. Bening, Katy, TX (US)

(73) Assignee: Kraton Polymers US LLC, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 11/686,188

(22) Filed: Mar. 14, 2007

(65) Prior Publication Data

US 2008/0015306 A1   Jan. 17, 2008

Related U.S. Application Data

(63) Continuation-in-part of application No. 11/388,909, filed on Mar. 24, 2006.

(51) Int. Cl.
   *C08L 53/02*   (2006.01)
(52) U.S. Cl. .............. 525/98; 525/88; 525/89; 525/99; 525/242; 525/338; 524/505
(58) Field of Classification Search ............. 525/88, 525/89, 98, 99, 242, 338; 524/505
See application file for complete search history.

(56) References Cited

U.S. PATENT DOCUMENTS

| | | |
|---|---|---|
| 3,149,182 A | 9/1964 | Porter |
| 3,369,160 A | 2/1968 | Koppel et al. |
| RE27,145 E | 6/1971 | Jones |
| 3,595,942 A | 7/1971 | Wald et al. |
| 3,634,549 A | 1/1972 | Shaw et al. |
| 3,670,054 A | 6/1972 | De La Mare et al. |
| 3,700,633 A | 10/1972 | Wald et al. |
| 3,766,295 A * | 10/1973 | Crossland et al. ............. 525/93 |
| 3,985,830 A | 10/1976 | Fetters et al. |
| 4,039,593 A | 8/1977 | Kamienski et al. |
| 4,122,134 A | 10/1978 | Miki et al. |
| 4,167,545 A | 9/1979 | Fahrbach et al. |
| 4,248,981 A | 2/1981 | Milkovich et al. |
| 4,391,949 A | 7/1983 | St. Clair |
| 4,444,953 A | 4/1984 | St. Clair |
| 4,578,429 A | 3/1986 | Gergen et al. |
| 4,783,361 A | 11/1988 | Ovshinsky et al. |
| 4,882,384 A | 11/1989 | Willis et al. |
| 4,898,914 A | 2/1990 | Gergen et al. |
| 4,925,899 A | 5/1990 | Rendina et al. |
| 4,970,265 A | 11/1990 | Willis |
| 5,206,300 A | 4/1993 | Chamberlain |
| 5,274,036 A | 12/1993 | Korpman et al. |
| 5,276,101 A | 1/1994 | Chamberlain et al. |
| 5,436,298 A * | 7/1995 | Moczygemba et al. ...... 525/314 |
| 5,506,299 A | 4/1996 | Gelles et al. |
| 5,516,831 A | 5/1996 | Pottick et al. |
| 5,545,690 A | 8/1996 | Trepka et al. |
| 5,587,237 A | 12/1996 | Korpman et al. |
| 5,693,718 A | 12/1997 | De Groot et al. |
| 5,705,569 A | 1/1998 | Moczygemba et al. |
| 5,760,135 A | 6/1998 | Korpman et al. |
| 5,910,546 A | 6/1999 | Trepka et al. |
| 6,031,053 A | 2/2000 | Knoll et al. |
| 6,096,828 A | 8/2000 | DePorter et al. |
| 6,197,889 B1 | 3/2001 | Knoll et al. |
| 6,265,485 B1 | 7/2001 | Trepka et al. |
| 6,420,486 B1 | 7/2002 | DePorter et al. |
| 6,492,469 B2 | 12/2002 | Willis et al. |
| 6,521,712 B1 | 2/2003 | Knoll et al. |
| 6,593,430 B1 | 7/2003 | Knoll et al. |
| 6,759,454 B2 | 7/2004 | Stephens et al. |
| 6,987,142 B2 | 1/2006 | St. Clair et al. |
| 7,001,956 B2 | 2/2006 | Handlin, Jr. et al. |
| 7,012,118 B2 | 3/2006 | Hansen et al. |
| 7,067,589 B2 | 6/2006 | Bening et al. |
| 7,084,347 B2 | 8/2006 | Mhetar et al. |
| 7,138,456 B2 | 11/2006 | Bening et al. |
| 7,141,621 B2 | 11/2006 | St. Clair et al. |
| 7,169,848 B2 * | 1/2007 | Bening et al. ................. 525/88 |
| 7,169,850 B2 | 1/2007 | Handlin, Jr. et al. |
| 7,217,886 B2 | 5/2007 | Mhetar et al. |
| 7,220,917 B2 | 5/2007 | Mhetar et al. |
| 7,223,816 B2 | 5/2007 | Handlin, Jr. et al. |
| 7,226,484 B2 | 6/2007 | Chen |
| 7,244,785 B2 | 7/2007 | Bening et al. |
| 7,267,855 B2 | 9/2007 | Handlin, Jr. et al. |
| 7,282,536 B2 | 10/2007 | Handlin, Jr. et al. |
| 7,290,367 B2 | 11/2007 | Chen |
| 2003/0149140 A1 | 8/2003 | Stephens et al. |
| 2003/0166776 A1 | 9/2003 | Wright et al. |
| 2003/0181584 A1 | 9/2003 | Handlin, Jr. et al. |
| 2004/0138371 A1 | 7/2004 | St. Clair et al. |

(Continued)

FOREIGN PATENT DOCUMENTS

| | | |
|---|---|---|
| CA | 716645 | 8/1965 |
| WO | 2006065519 A1 | 6/2006 |
| WO | 2007/111853 A2 | 10/2007 |

OTHER PUBLICATIONS

USPTO Office Action Mailed Apr. 3, 2008, from U.S. Appl. No. 11/388,628.

*Primary Examiner*—Roberto Rábago
(74) *Attorney, Agent, or Firm*—Dean F. Vance; Novak Druce & Quigg LLP

(57) ABSTRACT

The present invention relates to novel compositions comprising (a) anionic block copolymers of mono alkenyl arenes and conjugated dienes where one of the blocks is a controlled distribution copolymer of a conjugated diene and mono alkenyl arene having a specific arrangement of the monomers in the copolymer block, and (b) tailored softening modifiers have a particular structure that results in a surprising improvement in properties for the composition. Also included are processes for the manufacturing such novel compositions and various end-uses and applications for such compositions.

25 Claims, 1 Drawing Sheet

U.S. PATENT DOCUMENTS

| | | |
|---|---|---|
| 2005/0171290 A1 | 8/2005 | Bening et al. |
| 2005/0288406 A1 | 12/2005 | Gallucci et al. |
| 2006/0106139 A1 | 5/2006 | Kosaka et al. |
| 2006/0131050 A1 | 6/2006 | Mhetar et al. |
| 2006/0131059 A1 | 6/2006 | Xu et al. |
| 2006/0205849 A1 | 9/2006 | St. Clair |
| 2006/0205904 A1 | 9/2006 | St. Clair |
| 2007/0225427 A1 | 9/2007 | Wright et al. |
| 2007/0225428 A1 | 9/2007 | Bening et al. |
| 2007/0225429 A1 | 9/2007 | Wright et al. |

* cited by examiner

BLOCK COPOLYMER COMPOSITIONS

This application is a continuation-in-part of U.S. patent application Ser. No. 11/388,909, filed Mar. 24, 2006.

FIELD OF THE INVENTION

This invention relates to novel compositions comprising (a) anionic block copolymers of mono alkenyl arenes and conjugated dienes where one of the blocks is a controlled distribution copolymer of a conjugated diene and mono alkenyl arene having a specific arrangement of the monomers in the copolymer block, and (b) tailored softening modifiers have a particular structure that results in a surprising improvement in properties for the composition.

BACKGROUND OF THE INVENTION

The preparation of block copolymers is well known. In a representative synthetic method, an initiator compound is used to start the polymerization of one monomer. The reaction is allowed to proceed until all of the monomer is consumed, resulting in a living homopolymer. To this living homopolymer is added a second monomer that is chemically different from the first. The living end of the first polymer serves as the site for continued polymerization, thereby incorporating the second monomer as a distinct block into the linear polymer. The block copolymer so grown is living until terminated.

Termination converts the living end of the block copolymer into a non-propagating species, thereby rendering the polymer non-reactive toward monomer or coupling agent. A polymer so terminated is commonly referred to as a diblock copolymer. If the polymer is not terminated the living block copolymers can be reacted with additional monomer to form a sequential linear tri-block copolymer. Alternatively the living block copolymer can be contacted with multifunctional agents commonly referred to as coupling agents. Coupling two of the living ends together results in a linear triblock copolymer having twice the molecular weight of the starting, living, diblock copolymer. Coupling more than two of the living diblock copolymer regions results in a radial block copolymer architecture having at least three arms.

One of the first patents on linear ABA block copolymers made with styrene and butadiene is U.S. Pat. No. 3,149,182. These polymers in turn could be hydrogenated to form more stable block copolymers, such as those described in U.S. Pat. Nos. 3,595,942 and Re. 27,145. Various block copolymers and processes for making them have been proposed over the years. Recently, KRATON Polymers introduced a new class of hydrogenated styrene/diene block copolymers that have a unique structure and a unique balance of properties. These polymers, known as controlled distribution block copolymers, have mono alkenyl arene end blocks and controlled distribution blocks of mono alkenyl arenes and conjugated dienes. See US Published Patent Applications 2003/0176582 A1, 2003/0181585 A1, 2003/0176574 A1, 2003/0166776 A1 and related patents and published applications around the world. Such block copolymers have found numerous uses in, e.g., personal hygiene applications, in compounding applications and for over molding applications.

While block copolymers are often used in compounded form, the presence of certain of the typical blending components can also have a detrimental impact on properties. Common blending components include plasticizing oils, tackifying resins, polymers, oligomers, fillers, reinforcements and additives of all varieties. Oils are often added to such block copolymers to increase softness and improve processability to the compound. However, such oils also typically reduce the strength and tear resistance of the compounds. What is needed now are new compounding materials that do not have such a dramatic negative effect on properties, while still imparting increased softness with improved processability.

Applicants have now discovered that, when certain low molecular weight anionic diene/vinyl aromatic oligomers or polymers are combined in a particular way with the controlled distribution block copolymers noted above, it is possible to obtain compounds having better strength and tear resistance than the analogous oiled compounds, and also experience significant improvements in manufacturing steps and economies as well as improved properties such as increased softness without a significant reduction in processability. In addition, such compositions have lower volatility at equivalent hardness, resulting in improved organoleptics, reduced fogging and reduced extractables.

SUMMARY OF THE INVENTION

The particular compositions of the present invention are "in-situ compositions", since the low molecular weight tailored softening modifier (which improves flow and softness) is made and/or finished "in-situ", along with the controlled distribution block copolymer. This "in-situ" recovery is essential since recovery of the tailored modifier as a neat material from the solvent in which it is manufactured is very difficult and problematic. At room temperature, softening modifiers have physical properties that are intermediate between free flowing solids and pourable liquids. They are difficult to handle as neat materials. For this reason, it is desirable to recover (finish) them from the manufacturing solvent as a blend with the base block copolymer that they have been designed to modify. The blend can thus be recovered as an easy to handle solid.

The tailored softening modifier/base polymer blend may be prepared before recovery from the manufacturing solvent by 1) combining separate process streams containing the individual components—modifier and base block copolymer or 2) preparing them in the same process stream. The two approaches have different advantages. When the two components are polymerized separately and the solvent blend is prepared by mixing prior to finishing, there are few constraints on the chemistry that may be used to make the softening modifier or the base polymer. The manufacturing chemistry and associated technologies can be rather simple and robust. The softening modifier might be prepared by a conventional anionic polymerization technique—1) initiation using a metal alkyl such as a lithium alkyl, 2) propagation by addition of the appropriate monomer(s), and 3) termination of the living chain end by addition of a stoichiometric amount of a protic reagent such as an alcohol. Alternatively, a polymerization chain transfer agent, such as a secondary amine, might be used to allow the preparation of more than one tailored softening modifier molecule per molecule of polymerization initiator. In this embodiment, the base block copolymer is prepared in a separate process step and can be made using any of the known processes for the synthesis of a block copolymer. Another approach may be to take the controlled distribution block copolymer and redissolve it in an appropriate solvent, and then combine it with a solution of the tailored softening modifier, and finish the two together.

Accordingly, the present invention broadly comprises a novel block copolymer composition comprising:
(a) 100 parts by weight of a solid hydrogenated controlled distribution block copolymer having the general configuration A-B, A-B-A, $(A-B)_n$, $(A-B-A)_n$, $(A-B-A)_nX$, $(A-B)_nX$ or mixtures thereof, where n is an integer from 2 to about 30, and X is coupling agent residue and wherein:
  i. prior to hydrogenation each A block is a mono alkenyl arene polymer block and each B block is a controlled distribution copolymer block of at least one conjugated diene and at least one mono alkenyl arene having a blockiness index ($I_1$) of less than about 40 percent;
  ii. subsequent to hydrogenation about 0-10% of the arene double bonds have been reduced, and at least about 90% of the conjugated diene double bonds have been reduced;
  iii. each A block having a peak molecular weight between about 3,000 and about 60,000 and each B block having a peak molecular weight ($MW_1$) between about 30,000 and about 300,000;
  iv. each B block comprises terminal regions adjacent to the A blocks that are rich in conjugated diene units and one or more regions not adjacent to the A blocks that are rich in mono alkenyl arene units;
  v. the total amount of mono alkenyl arene in the hydrogenated block copolymer is about 20 percent weight to about 80 percent weight; and
  vi. the weight percent of mono alkenyl arene in each B block ($S_1$) is between about 5 percent and about 75 percent; and
(b) 5 to 250 parts by weight of a hydrogenated tailored softening modifier which is structurally related to the character of the B block of said controlled distribution block copolymer wherein:
  i. said softening modifier contains at least one conjugated diene and at least one mono alkenyl arene having a blockiness index $I_2$, such that the ratio of $I_2/I_1$ is between 0.1 and 10.0;
  ii. subsequent to hydrogenation about 0-10% of the arene double bonds have been reduced, and at least about 90% of the conjugated diene double bonds have been reduced;
  iii. the ratio $(MW_2)/(MW_1)$ of the peak molecular weight of said softening modifier ($MW_2$) to the peak molecular weight of said B block of said controlled distribution block copolymer ($MW_1$) is 0.01 to 1.0, with a minimum molecular weight ($MW_2$) of 2,000 g/mol;
  iv. the weight percent of mono alkenyl arene in each softening modifier ($S_2$) is between about 5 percent and about 75 percent and the ratio of $S_2/S_1$ is between 0.5 and 1.5; and
(c) wherein said controlled distribution block copolymer is polymerized in solution in the presence of a solvent in a first reactor to form a first solution and said softening modifier is polymerized in solution in the presence of a solvent in a second reactor to form a second solution;
(d) said first and second solutions are combined to form a common solution; and
(e) the solvent is removed from the common solution, providing an intimate mixture of said controlled distribution block copolymer and said tailored softening modifier.

These particular compositions are termed "in-situ compositions", since the low molecular weight tailored modifier (which acts to improve flow and softness) is made or finished "in-situ", along with the controlled distribution block copolymer. When the tailored softening modifier is made originally in a separate reactor and in a separate solution, there are a number of means to combine the solutions and obtain the particular in-situ composition. These include:
  1. combining the first solution and second solutions after polymerization of both components prior to hydrogenation, hydrogenating the combined controlled distribution block copolymer and tailored softening modifier in the common solution, and recovering the combined product in a finishing step;
  2. combining the first solution and second solution after polymerization of both components and after hydrogenation, and then finishing the solvent blend;
  3. adding the second solution to the first solution prior to polymerization of the controlled distribution block copolymer, and then continuing with polymerization, hydrogenation and finishing;
  4. adding the second solution to the first solution during the polymerization of the controlled distribution block copolymer, followed by hydrogenation and finishing; or
  5. redissolving a solid controlled distribution block copolymer in a solvent to form a first solution, polymerizing and hydrogenating the tailored softening modifier in a second solution, combining the first and second solutions, and then finishing the solvent blend.

Alternatively, it is possible to make the particular composition in a single reactor. In this case, the composition comprises:
(a) 100 parts by weight of a solid hydrogenated controlled distribution block copolymer having the general configuration A-B, A-B-A, $(A-B)_n$, $(A-B-A)_n$, $(A-B-A)_nX$, $(A-B)_nX$ or mixtures thereof, where n is an integer from 2 to about 30, and X is coupling agent residue and wherein:
  i. prior to hydrogenation each A block is a mono alkenyl arene polymer block and each B block is a controlled distribution copolymer block of at least one conjugated diene and at least one mono alkenyl arene having a blockiness index ($I_1$) of less than about 40 percent;
  ii. subsequent to hydrogenation about 0-10% of the arene double bonds have been reduced, and at least about 90% of the conjugated diene double bonds have been reduced;
  iii. each A block having a peak molecular weight between about 3,000 and about 60,000 and each B block having a peak molecular weight ($MW_1$) between about 30,000 and about 300,000;
  iv. each B block comprises terminal regions adjacent to the A blocks that are rich in conjugated diene units and one or more regions not adjacent to the A blocks that are rich in mono alkenyl arene units;
  v. the total amount of mono alkenyl arene in the hydrogenated block copolymer is about 20 percent weight to about 80 percent weight; and
  vi. the weight percent of mono alkenyl arene in each B block ($S_1$) is between about 5 percent and about 75 percent; and
(b) 5 to 250 parts by weight of a hydrogenated tailored softening modifier which is structurally related to the character of the B block of said controlled distribution block copolymer wherein:
  i. said softening modifier contains at least one conjugated diene and at least one mono alkenyl arene having a blockiness index $I_2$, such that the ratio of $I_2/I_1$ is between 0.1 and 10.0;

ii. subsequent to hydrogenation about 0-10% of the arene double bonds have been reduced, and at least about 90% of the conjugated diene double bonds have been reduced;

iii. the ratio $(MW_2)/(MW_1)$ of the peak molecular weight of said softening modifier $(MW_2)$ to the peak molecular weight of said B block of said controlled distribution block copolymer $(MW_1)$ is 0.01 to 1.0, with a minimum molecular weight $(MW_2)$ of 2,000;

iv. the weight percent of mono alkenyl arene in each softening modifier $(S_2)$ is between about 5 percent and about 75 percent and the ratio of $S_2/S_1$ is between 0.5 and 1.5; and (c) wherein said controlled distribution block copolymer is formed in solution in a reactor in the presence of a solvent to form a solution and said tailored softening modifier is formed in the same solution in the same reactor; and (d) the solvent is removed from the solution, providing an intimate mixture of said controlled distribution block copolymer and said tailored softening modifier.

In this case, where a single reactor is employed, the alternatives include varying the order of polymerization, wherein:

1. the softening agent is polymerized prior to the controlled distribution block copolymer;
2. the softening agent is polymerized during the polymerization of the controlled distribution block copolymer; and
3. the softening agent is polymerized after the controlled distribution block copolymer.

In still a third variant, it is possible to have a composition in which the controlled distribution block copolymer is hydrogenated, and the tailored softening modifier is not hydrogenated. In that case, the solution of the hydrogenated controlled distribution block copolymer is combined with the solution of the un-hydrogenated tailored softening modifier, and then the resulting blend is recovered.

As shown in the examples that follow, compositions of the present invention will have improved strength and lower tendency for oil bleed out. In addition, it will be possible to obtain compositions and articles with low gas permeability. Still further it will be possible to obtain compositions having lower volatility at equivalent hardness, along with improved organoleptics, improved fogging characteristics and lowered extractable levels. Of primary interest, it will be possible to obtain significant and unexpected process advantages by practice of the present invention. Details regarding the particular controlled distribution block copolymers and tailored softening modifiers, along with the processes for making them are described further below.

DETAILED DESCRIPTION OF THE INVENTION

Figure 1:
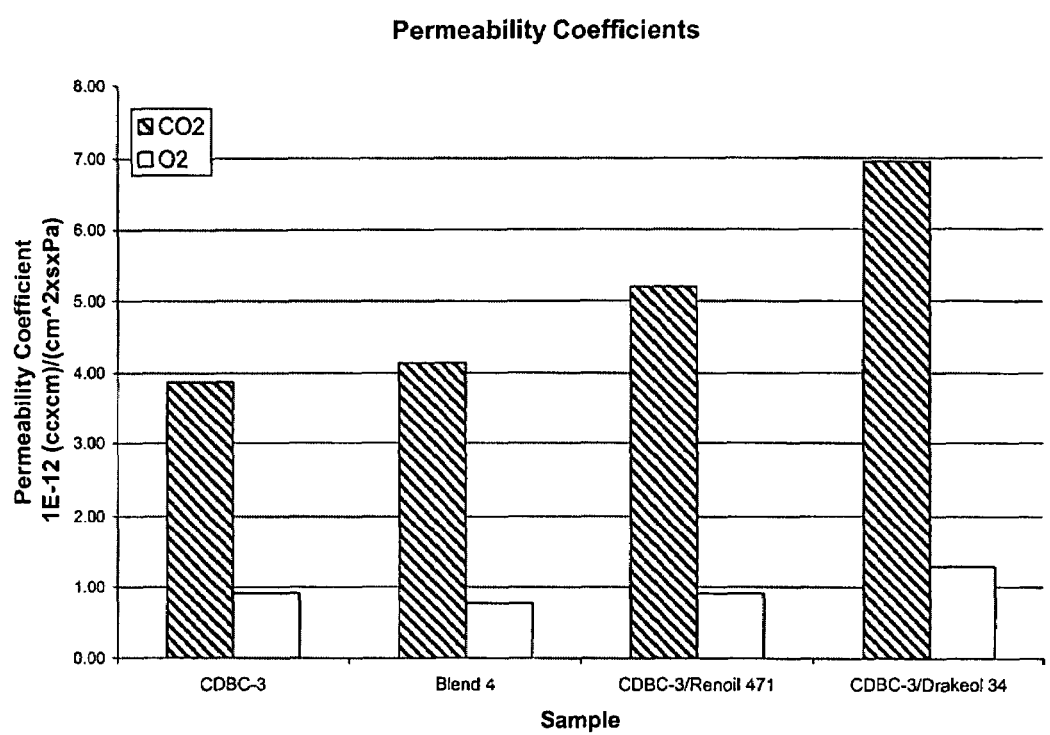
FIG. 1 illustrates a reduction in $CO_2$ and $O_2$ permeability coefficients for controlled distribution block copolymers that contain a tailored softening modifier as compared to the use of traditional oils.

The present invention offers novel compositions and methods of preparing such compositions. The two basic components in the novel compositions are (a) a controlled distribution block copolymer having a particular distribution of alkenyl arenes and dienes as part of a mono alkenyl arene/conjugated diene block, and (b) a novel tailored softening modifier (both hydrogenated and unhydrogenated).

1. Controlled Distribution Block Copolymers

The controlled distribution block copolymer is described and claimed in US Published Patent Application 2003/0176582 A1, published Sep. 18, 2003. As shown in the Published Patent Application, the combination of (1) a unique control for the monomer addition and (2) the optional use of diethyl ether or other modifiers as a component of the solvent (which will be referred to as "distribution agents") results in a certain characteristic distribution of the two monomers (herein termed a "controlled distribution" polymerization, i.e., a polymerization resulting in a "controlled distribution" structure), and also results in the presence of certain mono alkenyl arene rich regions and certain conjugated diene rich regions in the polymer block. For purposes hereof, "controlled distribution" is defined as referring to a molecular structure having the following attributes: (1) terminal regions adjacent to the mono alkenyl arene homopolymer ("A") blocks that are rich in (i.e., having a greater than average amount of) conjugated diene units; (2) one or more regions not adjacent to the A blocks that are rich in (i.e., having a greater than average amount of) mono alkenyl arene units; and (3) an overall structure having relatively low blockiness. For the purposes hereof, "rich in" is defined as greater than the average amount, preferably greater than 5% above the average amount. This relatively low blockiness can be shown by either the presence of only a single glass transition temperature ("Tg,") intermediate between the Tg's of either monomer alone, when analyzed using differential scanning calorimetry ("DSC") thermal methods or via mechanical methods, or as shown via proton nuclear magnetic resonance ("H-NMR") methods. The potential for blockiness can also be inferred from measurement of the UV-visible absorbance in a wavelength range suitable for the detection of polystyryllithium end groups during the polymerization of the B block. A sharp and substantial increase in this value is indicative of a substantial increase in polystyryllithium chain ends. In this process, this will only occur if the conjugated diene concentration drops below the critical level to maintain controlled distribution polymerization. Any styrene monomer that is present at this point will add in a blocky fashion. The term "styrene blockiness", as measured by those skilled in the art using proton NMR, is defined to be the proportion of S units in the polymer having two S nearest neighbors on the polymer chain. The styrene blockiness is determined after using H-1 NMR to measure two experimental quantities as follows:

First, the total number of styrene units (i.e. arbitrary instrument units which cancel out when ratioed) is determined by integrating the total styrene aromatic signal in the H-1 NMR spectrum from 7.5 to 6.2 ppm and dividing this quantity by 5 to account for the 5 aromatic hydrogens on each styrene aromatic ring.

Second, the blocky styrene units are determined by integrating that portion of the aromatic signal in the H-1 NMR spectrum from the signal minimum between 6.88 and 6.80 to 6.2 ppm and dividing this quantity by 2 to account for the 2 ortho hydrogens on each blocky styrene aromatic ring. The assignment of this signal to the two ortho hydrogens on the rings of those styrene units which have two styrene nearest neighbors was reported in F. A. Bovey, *High Resolution NMR of Macromolecules* (Academic Press, New York and London, 1972), chapter 6.

The styrene blockiness is simply the percentage of blocky styrene to total styrene units:

Blocky %=100 times(Blocky Styrene Units/Total Styrene Units)

Expressed thus, Polymer-Bd-S—(S)n-S-Bd-Polymer, where n is greater than zero is defined to be blocky styrene. For example, if n equals 8 in the example above, then the blockiness index would be 80%. It is preferred that the blockiness index be less than about 40. For some polymers, having styrene contents of ten weight percent to forty weight percent, it is preferred that the blockiness index be less than about 10.

This controlled distribution structure is very important in managing the strength and Tg of the resulting copolymer, because the controlled distribution structure ensures that there is virtually no phase separation of the two monomers, i.e., in contrast with block copolymers in which the monomers actually remain as separate "microphases", with distinct Tg's, but are actually chemically bonded together. This controlled distribution structure assures that only one Tg is present and that, therefore, the thermal performance of the resulting copolymer is predictable and, in fact, predeterminable. Furthermore, when a copolymer having such a controlled distribution structure is then used as one block in a di-block, tri-block or multi-block copolymer, the relatively higher Tg made possible by means of the presence of an appropriately-constituted controlled distribution copolymer region will tend to improve flow and processability. Modification of certain other properties is also achievable.

In a preferred embodiment of the present invention, the subject controlled distribution copolymer block has two distinct types of regions—conjugated diene rich regions on the end of the block and a mono alkenyl arene rich region near the middle or center of the block. What is desired is a mono alkenyl arene/conjugated diene controlled distribution copolymer block, wherein the proportion of mono alkenyl arene units increases gradually to a maximum near the middle or center of the block and then decreases gradually until the polymer block is fully polymerized. This structure is distinct and different from the tapered and/or random structures discussed in the prior art.

Regarding the particular parameters of the controlled distribution block copolymer used in the present invention, the hydrogenated controlled distribution block copolymer has the general configuration A-B, A-B-A, (A-B)$_n$, (A-B-A)$_n$, (A-B-A)$_n$X, (A-B)$_n$X or mixtures thereof, where n is an integer from 2 to about 30, and X is coupling agent residue and wherein:

i. prior to hydrogenation each A block is a mono alkenyl arene polymer block and each B block is a controlled distribution copolymer block of at least one conjugated diene and at least one mono alkenyl arene having a blockiness index (I$_1$) of less than about 40 percent;
  ii. subsequent to hydrogenation about 0-10% of the arene double bonds have been reduced, and at least about 90% of the conjugated diene double bonds have been reduced;
  iii. each A block having a peak molecular weight between about 3,000 and about 60,000 and each B block having a peak molecular weight (MW$_1$) between about 30,000 and about 300,000;
  iv. each B block comprises terminal regions adjacent to the A blocks that are rich in conjugated diene units and one or more regions not adjacent to the A blocks that are rich in mono alkenyl arene units;
  v. the total amount of mono alkenyl arene in the hydrogenated block copolymer is about 20 percent weight to about 80 percent weight; and
  vi. the weight percent of mono alkenyl arene in each B block (S$_1$) is between about 5 percent and about 75 percent.

The following are preferred ranges for the various properties of the controlled distribution block copolymer:

The mono alkenyl arene is preferably styrene and the conjugated diene is preferably 1,3-butadiene, isoprene or mixture thereof, more preferably 1,3-butadiene;
  The blockiness index (I$_1$) of the B block is preferably 1 to 40 percent, more preferably 1 to 10 percent;
  The structure is either a linear A-B-A block copolymer or a radial (A-B)$_n$X block copolymer where n is 2 to 6. For certain applications, a linear block copolymer is preferred, while for other applications, a radial or branched block copolymer is preferred. It is also possible to have a combination of linear block copolymer and a radial block copolymer;
  Subsequent to hydrogenation about 0-5% of the arene double bonds have been reduced, and at least about 95% of the conjugated diene double bonds have been reduced;
  Each A block preferably has a peak molecular weight between about 3,000 and about 60,000, more preferably between about 5,000 and 45,000, and each B block preferably has a peak molecular weight (MW$_1$) between about 30,000 and about 300,000 if it is a linear block copolymer and half that amount if it is a radial block copolymer;
  The total amount of mono alkenyl arene in the hydrogenated block copolymer is preferably about 20 percent weight to about 80 percent weight, more preferably about 30 to about 70 percent weight; and
  The weight percent of mono alkenyl arene in each B block (S$_1$) is preferably between about 5 percent and about 75 percent, more preferably between 10 and 70 weight percent.

2. Hydrogenated Tailored Softening Modifier

The hydrogenated tailored softening modifier used with the controlled distribution block copolymer is structurally related to the character of the B block of the controlled distribution block copolymer wherein:

i. the softening modifier contains at least one conjugated diene and at least one mono alkenyl arene having a blockiness index I$_2$, such that the ratio of I$_2$/I$_1$ is between 0.1 and 10.0;
  ii. subsequent to hydrogenation about 0-10% of the arene double bonds have been reduced, and at least about 90% of the conjugated diene double bonds have been reduced;
  iii. the ratio (MW$_2$)/(MW$_1$) of the peak molecular weight of said softening modifier (MW$_2$) to the peak molecular weight of said B block of said controlled distribution block copolymer (MW$_1$) is 0.01 to 1.0, with a minimum molecular weight (MW$_2$) of 2,000 g/mol; and
  iv. the weight percent of mono alkenyl arene in each softening modifier (S$_2$) is between about 5 percent and about 75 percent and the ratio of S$_2$/S$_1$ is between 0.5 and 1.5.

The following are preferred ranges for the properties of the Tailored Softening Modifier:

The monoalkenyl arene is preferably styrene and the conjugated diene is preferably 1,3-butadiene, isoprene or mixtures thereof, more preferably 1,3-butadiene;
  The blockiness index (I$_2$) of the modifier is preferably 1 to 80 percent, more preferably 1 to 20 percent
  The ratio of I$_2$/I$_1$ is preferably between 0.1 and 7.0 for opaque compositions, and preferably between 0.1 and 2.0 for transparent compositions;
  Subsequent to hydrogenation about 0-5% of the arene double bonds have been reduced, and at least about 95% of the conjugated diene double bonds have been reduced the ratio $(MW_2)/(MW_1)$ of the peak molecular weight of said softening modifier $(MW_2)$ to the peak molecular weight of said B block of said controlled distribution block copolymer $(MW_1)$ is 0.02 to 1.0, preferably 0.05 to 0.6, with a minimum molecular weight $(MW_2)$ of 2,000 g/mol; and the weight percent of mono alkenyl arene in each softening modifier $(S_2)$ is preferably between about 20 percent and about 50 percent and the ratio of $S_2/S_1$ is preferably between 0.75 and 1.25.

in certain cases, it is preferable to have an unhydrogenated tailored softening modifier. For example, where there is a desire to crosslink the blend of the controlled distribution block copolymer and the tailored modifier, the residual unsaturation in the tailored softening modifier allows the overall composition to be crosslinked, by, for example, peroxide, heat and shear, ultraviolet radiation, or electron beam radiation.

3. Overall Process to Make Controlled Distribution Block Copolymer and Tailored Softening Modifier Anionic, solution co-polymerization to form the controlled distribution copolymers and tailored softening modifiers of the present invention can be carried out using, to a great extent, known and previously employed methods and materials. In general, the co-polymerization is attained anionically, using known selections of adjunct materials, including polymerization initiators, solvents, promoters, and structure modifiers, but in a preferred feature of the present invention, in the presence of a certain distribution agent. Such distribution agent is, in preferred embodiments, a non-chelating ether. Examples of such ether compounds are cyclic ethers such as tetrahydrofuran and tetrahydropyrane and aliphatic monoethers such as diethyl ether and dibutyl ether. In some cases, particularly where the vinyl content of the conjugated diene is to be over 50%, it may be necessary to use a chelating agent, including dialkyl ethers of ethylene glycol and aliphatic polyethers such as diethylene glycol dimethyl ether and diethylene glycol diethyl ether. Other distribution agents include, for example, ortho-dimethoxybenzene or "ODMB", which is sometimes referred to as a chelating agent. Preferably the ether is an aliphatic monoether, and more preferably diethyl ether. Such co-polymerization can be conducted as a batch, semi-batch, or continuous preparation, with batch being most preferred, but regardless, it is important that the randomization agent be present in the selected solvent prior to or concurrent with the beginning of the co-polymerization process.

The introduction of the distribution agent counteracts the preference of the growing chain end to attach to one monomer over another. For example, in the case of styrene and a diene, the preference would be toward the diene. This distribution agent operates to promote more efficient "controlled distribution" co-polymerization of the two monomers because the living chain end "sees" one monomer approximately as easily as it "sees" the other. The polymerization process is thereby "tuned" to allow incorporation of each of the monomers into the polymer at nearly the same rate. Such a process results in a copolymer having no "long runs" of either of the monomer components—in other words, a controlled distribution copolymer as defined hereinabove. In the preferred process, the mono alkenyl arene monomer will be nearly consumed by the time that the slow addition of the second aliquot of diene is complete, so that the polymerization ends rich in the conjugated diene. Short blocks of the conjugated diene monomer may be formed throughout the polymerization, but blocks of the mono alkenyl arene monomer are only formed when the concentration of the conjugated diene monomer becomes quite low. Under the preferred conditions, the cumulative percentage of the mono alkenyl arene monomer in the B block peaks at about 40%-60% overall conversion, but only exceeds the final value by about 25%-30%. The result of this relatively uniform distribution of monomers is a product having a single Tg, which is a weighted average of the Tg values of the two corresponding homopolymers.

As noted above, the distribution agent is preferably a non-chelating ether. By "non-chelating" is meant that such ethers will not chelate with the growing polymer, that is to say, they will not form a specific interaction with the chain end, which is derived from the initiator compound (e.g., lithium ion). Because the non-chelating ethers used in the present invention operate by modifying the polarity of the entire polymerization charge, they are preferably used in relatively large concentrations. Where diethyl ether, which is preferred, is selected, it is preferably at a concentration from about 0.5 to about 10 percent, preferably about 1 to about 10 percent, by weight of the polymerization charge (solvent and monomers), and more preferably from about 3 to about 6 percent by weight. Higher concentrations of this monoether can alternatively be used, but appear to increase cost without added efficacy. When the distribution agent is ODMB, the amount used is typically about 20 to about 400 parts by million weight ("PPMW"), based on the total reactor contents, preferably about 20 to about 40 PPMW for low vinyl products and about 100 to 200 PPMW for higher vinyl products.

An important aspect of the present invention is to control the microstructure or vinyl content of the conjugated diene in the controlled distribution copolymer block B and in the softening modifier. The term "vinyl content" refers to the fact that a conjugated diene is polymerized via 1,2-addition (in the case of butadiene—it would be 3,4-addition in the case of isoprene). Although a pure "vinyl" group is formed only in the case of 1,2-addition polymerization of 1,3-butadiene, the effects of 3,4-addition polymerization of isoprene (and similar addition for other conjugated dienes) on the final properties of the block copolymer will be similar. The term "vinyl" refers to the presence of a pendant vinyl group on the polymer chain. When referring to the use of butadiene as the conjugated diene, it is preferred that about 20 to about 80 mol percent of the condensed butadiene units in the copolymer block have 1,2 vinyl configuration as determined by proton NMR analysis. For selectively hydrogenated block copolymers, preferably about 30 to about 70 mol percent of the condensed butadiene units should have 1,2 configuration. This is effectively controlled by varying the relative amount of the distribution agent. As will be appreciated, the distribution agent serves two purposes—it creates the controlled distribution of the mono alkenyl arene and conjugated diene, and also controls the microstructure of the conjugated diene. Suitable ratios of distribution agent to lithium are disclosed and taught in U.S. Pat. Re 27,145, which disclosure is incorporated by reference.

The solvent used as the polymerization vehicle may be any hydrocarbon that does not react with the living anionic chain end of the forming polymer, is easily handled in commercial polymerization units, and offers the appropriate solubility characteristics for the product polymer. For example, non-polar aliphatic hydrocarbons, which are generally lacking in ionizable hydrogens make particularly suitable solvents. Frequently used are cyclic alkanes, such as cyclopentane, cyclohexane, cycloheptane, and cyclooctane, all of which are relatively non-polar. Other suitable solvents will be known to one skilled in the art and can be selected to perform effectively in a given set of process conditions, with temperature being one of the major factors taken into consideration.

Starting materials for preparing the novel controlled distribution copolymers and softening modifiers of the present invention include the initial monomers. The alkenyl arene can be selected from styrene, alpha-methylstyrene, para-methylstyrene, vinyl toluene, vinylnaphthalene, and para-butyl styrene or mixtures thereof. Of these, styrene is most preferred and is commercially available, and relatively inexpensive, from a variety of manufacturers. In certain cases, it is preferred that the alkenyl arene used for the A blocks be alpha-methylstyrene or a mixture of alpha-methylstyrene and styrene. In that case, the end blocks will have a higher Tg or glass transition temperature.

The conjugated dienes for use herein are 1,3-butadiene and substituted butadienes such as isoprene, piperylene, 2,3-dimethyl-1,3-butadiene, and 1-phenyl-1,3-butadiene, or mixtures thereof. Of these, 1,3-butadiene is most preferred. As used herein, and in the claims, "butadiene" refers specifically to "1,3-butadiene".

Other important starting materials for anionic co-polymerizations include one or more polymerization initiators. In the present invention such include, for example, alkyl lithium compounds and other organolithium compounds such as s-butyllithium, n-butyllithium, t-butyllithium, amyllithium and the like, including di-initiators such as the di-sec-butyl lithium adduct of m-diisopropenyl benzene. Other such di-initiators are disclosed in U.S. Pat. No. 6,492,469. Of the various polymerization initiators, s-butyllithium is preferred. The initiator can be used in the polymerization mixture (including monomers and solvent) in an amount calculated on the basis of one initiator molecule per desired polymer chain. The lithium initiator process is well known and is described in, for example, U.S. Pat. Nos. 4,039,593 and Re. 27,145, which descriptions are incorporated herein by reference.

Polymerization conditions to prepare the novel copolymers of the present invention are typically similar to those used for anionic polymerizations in general. In the present invention polymerization is preferably carried out at a temperature of from about −30° to about 150° C., more preferably about 10° to about 100° C., and most preferably, in view of industrial limitations, about 30° to about 90° C. It is carried out in an inert atmosphere preferably nitrogen, and may also be accomplished under pressure within the range of from about 0.5 to about 10 bars. This copolymerization generally requires less than about 12 hours, and can be accomplished in from about 5 minutes to about 5 hours, depending upon the temperature, the concentration of the monomer components, the molecular weight of the polymer and the amount of distribution agent that is employed.

As discussed above, an important discovery of the present invention is the control of the monomer feed during the polymerization of the controlled distribution block B. To minimize blockiness, it is desirable to polymerize as much of the styrene as possible in the presence of butadiene. Towards that end, a preferred process adds the styrene charge as quickly as possible, while adding the butadiene slowly, so as to maintain a concentration of no less than about 0.1% wt of butadiene for as long as possible, preferably until the styrene is nearly exhausted. If the butadiene falls below this level, there is a risk that a styrene block will form at this point. It is generally undesirable to form a styrene block during the butadiene charge portion of the reaction.

If the polymer is to be prepared in a fully sequential process, it is preferable to ensure that the butadiene addition continues until about 90% of the monomers in block B have been polymerized, and the percentage of the mono alkenyl arene monomer in the non-reacted monomer pool has been reduced to less than 20% weight, preferably less than 15% weight. In this way the formation of styrene blocks is prevented throughout the majority of the polymerization and there is sufficient conjugated diene left at the end of the polymerization to ensure that the terminal region of the B block is richer in the diene monomer. The resulting polymer block has diene rich regions near the beginning and the end of the block and an arene rich region near the center of the block. In products of the preferred process, typically the first 15 to 25% and the last 75 to 85% of the block are diene rich, with the remainder considered to be arene rich. The term "diene rich" means that the region has a measurably higher ratio of diene to arene than the center region. Another way to express this is the proportion of mono alkenyl arene units increases gradually along the polymer chain to a maximum near the middle or center of the block and then decreases gradually until the polymer block is fully polymerized. In a preferred embodiment, all of the mono alkenyl arene and about 10 to 20 percent of the conjugated diene are charged to the reactor, and the remainder of the conjugated diene is added after about 5 to about 10 percent of the original monomers have polymerized.

When making the controlled distribution block copolymer, it is typically possible to achieve the desired distribution of the arene monomer in the final product using the process described above if fairly high levels of the distribution control agent are used. At higher midblock styrene levels and low levels of the distribution control agent, some blockiness is unavoidable. It is preferable to prepare these products by coupling. This insures that any blocky styrene that is formed is located at some distance from the end blocks. When polymers of the present invention are prepared by coupling, it is preferable to reserve 5% to 10% of the diene monomer, and add this charge once the polymerization of the arene monomer is complete. This ensures that all of the chains end in a diene unit. The living diene chain ends generally react more efficiently with coupling agents.

If the products of the present invention are being prepared in a reactor process in which all of the B monomer is charged to a reactor containing the living A block, it is preferable to start the diene monomer addition about 1 minute before starting the arene monomer addition. It is also preferable to charge both monomers rapidly at first and then decrease the diene addition rate once the majority of the arene monomer has been added. This process ensures that the initial region of the B block will be rich in the diene monomer, and builds a large enough pool to avoid becoming starved in the diene monomer early in process step. As discussed above, the optimal rates will depend on the styrene content of the midblock, the reaction temperature and the type and concentration of the distribution control agent used.

For the controlled distribution or B block the weight percent of mono alkenyl arene in each B block is between about 5 weight percent and about 75 weight percent, preferably between about 10 weight percent and about 70 weight percent for selectively hydrogenated polymers.

As used herein, "thermoplastic block copolymer" is defined as a block copolymer having at least a first block of one or more mono alkenyl arenes, such as styrene and a second block of a controlled distribution copolymer of diene and mono alkenyl arene. The method to prepare this thermoplastic block copolymer is via any of the methods generally known for block polymerizations. The present invention includes as an embodiment a thermoplastic copolymer composition, which may be either a di-block, tri-block copolymer, tetra-block copolymer or multi-block composition. In the case of the di-block copolymer composition, one block is the alkenyl arene-based homopolymer block and polymerized therewith is a second block of a controlled distribution copolymer of diene and alkenyl arene. In the case of the tri-block composition, it comprises, as end-blocks the glassy alkenyl arene-based homopolymer and as a mid-block the controlled distribution copolymer of diene and alkenyl arene. Where a tri-block copolymer composition is prepared, the controlled distribution diene/alkenyl arene copolymer can be herein designated as "B" and the alkenyl arene-based homopolymer designated as "A". The A-B-A, tri-block compositions can be made by either sequential polymerization or coupling. In the sequential solution polymerization technique, the mono alkenyl arene is first introduced to produce the relatively hard aromatic block, followed by introduction of the controlled distribution diene/alkenyl arene mixture to form the mid block, and then followed by introduction of the mono alkenyl arene to form the terminal block. In addition to the linear, A-B-A configuration, the blocks can be structured to form a radial (branched) polymer, $(A-B)_n X$, or both types of structures can be combined in a mixture. In addition it is contemplated that asymmetrical, polymodal block copolymers are included, where some of the A blocks have higher molecular weights than some of the other A blocks—e.g., such a polymer could have the structure $(A_1-B)_d$—X—$_e(B-A_2)$ where d is 1 to 30 and e is 1 to 30, and the molecular weight of A1 and A2 blocks differ by at least 20 percent. Some A-B diblock polymer can be present but preferably at least about 70 weight percent of the block copolymer is A-B-A or radial (or otherwise branched so as to have 2 or more terminal resinous blocks per molecule) so as to impart strength.

Preparation of radial (branched) polymers requires a post-polymerization step called "coupling". It is possible to have either a branched controlled distribution block copolymer and/or a branched tailored softening modifier. In the above radial formula for the controlled distribution block copolymer, n is an integer of from 2 to about 30, preferably from about 2 to about 15, and X is the remnant or residue of a coupling agent. A variety of coupling agents are known in the art and include, for example, dihalo alkanes, silicon halides, siloxanes, multifunctional epoxides, silica compounds, esters of monohydric alcohols with carboxylic acids, (e.g. dimethyl adipate) and epoxidized oils. Star-shaped polymers are prepared with polyalkenyl coupling agents as disclosed in, for example, U.S. Pat. Nos. 3,985,830; 4,391,949; and 4,444,953; Canadian Patent Number 716,645. Suitable polyalkenyl coupling agents include divinylbenzene, and preferably m-divinylbenzene. Preferred are tetra-alkoxysilanes such as tetra-ethoxysilane (TEOS), aliphatic diesters such as dimethyl adipate and diethyl adipate, and diglycidyl aromatic epoxy compounds such as diglycidyl ethers deriving from the reaction of bis-phenol A and epichlorohydrin.

Additional possible post-polymerization treatments that can be used to further modify the configuration of the polymers includes chain-termination. Chain termination simply prevents further polymerization and thus prevents molecular weight growth beyond a desired point. This is accomplished via the deactivation of active metal atoms, particularly active alkali metal atoms, and more preferably the active lithium atoms remaining when all of the monomer has been polymerized. Effective chain termination agents include water; alcohols such as methanol, ethanol, isopropanol, 2-ethylhexanol, mixtures thereof and the like; and carboxylic acids such as formic acid, acetic acid, maleic acid, mixtures thereof and the like. See, for example, U.S. Pat. No. 4,788,361, the disclosure of which is incorporated herein by reference. Other compounds are known in the prior art to deactivate the active or living metal atom sites, and any of these known compounds may also be used. Alternatively, the living copolymer may simply be hydrogenated to deactivate the metal sites.

The polymerization procedures described hereinabove, including preparation of the diene/alkenyl arene copolymer and of di-block and multi-block copolymers prepared therewith, can be carried out over a range of solids content, preferably from about 5 to about 80 percent by weight of the solvent and monomers, most preferably from about 10 to about 40 weight percent. For high solids polymerizations, it is preferable to add any given monomer, which may include, as previously noted, a previously prepared homopolymer or copolymer, in increments to avoid exceeding the desired polymerization temperature. Properties of a final tri-block polymer are dependent to a significant extent upon the resulting alkenyl content and diene content. It is preferred that, to ensure significantly elastomeric performance while maintaining desirably high Tg and strength properties, as well as desirable transparency, the tri-block and multi-block polymer's alkenyl arene content is greater than about 20% weight, preferably from about 20% to about 80% weight. This means that essentially all of the remaining content, which is part of the diene/alkenyl arene block, is diene.

It is also important to control the molecular weight of the various blocks. For an AB diblock, desired block weights are 3,000 to about 60,000 for the mono alkenyl arene A block, and 30,000 to about 300,000 for the controlled distribution conjugated diene/mono alkenyl arene B block. Preferred ranges are 5000 to 45,000 for the A block and 50,000 to about 250,000 for the B block. For the triblock, which may be a sequential ABA or coupled $(AB)_2 X$ block copolymer, the A blocks should be 3,000 to about 60,000, preferably 5000 to about 45,000, while the B block for the sequential block should be about 30,000 to about 300,000, and the B blocks (two) for the coupled polymer half that amount. The total average molecular weight for the triblock copolymer should be from about 40,000 to about 400,000, and for the radial copolymer from about 60,000 to about 600,000. For the tetrablock copolymer ABAB the block size for the terminal B block should be about 2,000 to about 40,000, and the other blocks may be similar to that of the sequential triblock copolymer. These molecular weights are most accurately determined by light scattering measurements, and are expressed as peak molecular weight.

4. Separate Reactor Process to Make Components

One alternative to prepare the in-situ compositions of the present invention is to polymerize the tailored softening modifier separately from the controlled distribution block copolymer in a separate reactor. The following alternatives are thus possible:

a) Addition of the Tailored Softening Modifier Solution Before or During the Preparation of the Controlled Distribution Block Copolymer.

Optionally, the solution of tailored softening modifier in its polymerization solvent could be used as the solvent for the synthesis of the controlled distribution block copolymer. Because the tailored modifier may be low in molecular weight (relative to the entanglement molecular weight for polymer), it is possible to select conditions such that it will contribute little to the solution viscosity of the blend. Solution viscosity is often the limiting factor affecting the amount of block copolymer that can be prepared in a batch polymerization process. In this scheme, the tailored softening modifier is in essence replacing some of the solvent that would have been used had the controlled distribution block copolymer been made in the usual way. When the solution of the blend is finished, more product, base block copolymer plus modifier, will be generated per pound of solution than would have been realized had the base block copolymer been prepared in the normal way. The efficiency of the polymerization process has been enhanced.

b) Addition of Tailored Softening Modifier Solution after the Preparation of the Base Block Copolymer.

The controlled distribution block copolymer might be prepared before the addition of the solution of the tailored softening modifier and the two streams could be blended prior to other polymer treatment steps such as hydrogenation, or wash or addition of antioxidants. Such a process would benefit from not having to apply these post-polymerization techniques to two separate streams.

c) Addition of Tailored Softening Modifier Solution Just Prior to Finishing.

Even if the solutions of the controlled distribution block copolymer and the tailored softening modifier are only combined immediately before the solvent removal step, this process benefits from the ease of being able to prepare the two components by the methods that are best suited to each of them. The two polymerization processes are not constrained to only those processing conditions that are compatible with both preparations. A robust process is envisioned. Also, a more energy efficient removal process may be realized since the blend would be at a higher solids content than the initial block copolymer solution itself.

d) Addition of Tailored Softening Modifier Solution to a Solution of Redissolved Controlled Distribution Block Copolymer and then Finishing In this example, a solid controlled distribution block copolymer is redissolved in an appropriate solvent, and is then combined with the solution of the tailored softening modifier prior to finishing both materials together.

5. Single Reactor Process to Make Components

On the other hand, preparation of the tailored softening modifier and the controlled distribution block copolymer in the same reactor obviates the need for a second polymerization vessel and the associated process control equipment. In this approach, equipment costs could be substantially reduced. Not wishing to be limited to the process concepts described below, the following examples are offered as illustrations of how this approach could be practiced.

a) Preparation of the Tailored Softening Modifier Prior to the Preparation of the Controlled Distribution Block Copolymer.

This approach is essentially the same as outlined above for the case where the tailored softening modifier solution is used to replace part of the solvent for the preparation of the block copolymer. All of the efficiencies of that process would be realized with the added benefit that only one vessel would be used in the present example.

b) Preparation of the Tailored Softening Modifier During the Preparation of the B Block, where the B Block of the Controlled Distribution Block Copolymer is Synthesized First.

In this approach, sufficient initiator would be added to start the polymerization of both the tailored modifier and the controlled distribution block copolymer at the same time. When sufficient monomer had been polymerized (as controlled by programmed addition of the monomer or controlled by time of termination under a kinetically regulated scheme) to make tailored modifier of the desired molecular weight, the living chain ends for the tailored modifier portion of the mixture are terminated by addition of the appropriate amount of a protic moiety such as an alcohol. The remaining living chains being those of the incipient base block copolymer are allowed to continue polymerization to the completion of the first block of the copolymer. Addition of the second monomer(s), at that point, would allow the construction of a block copolymer using conventional techniques for the synthesis of such polymers (to include sequential addition of monomer methods, coupling chemistries, and various post polymerization techniques such as hydrogenation). This approach has all of the advantages of the first described method in this section, with the added bonus that one polymerization step has been eliminated so that a faster polymerization cycle time may be realized.

c) Preparation of the Tailored Softening Modifier During the Preparation of the B Block of the Controlled Distribution Block Copolymer, where the B Block is Synthesized Last.

The converse of the above process is to make the tailored softening modifier during the last polymerization step for the controlled distribution block copolymer. In this process, a second charge of the initiator species is added at an appropriate point in the last step of the polymerization of the controlled distribution block copolymer to allow "re-initiation" of polymerization and sufficient propagation of the freshly initiated species to generate the tailored softening modifier of the desired molecular weight. The fresh batch of initiator could be charged to an on going polymerization at the right time to make the right molecule. Alternatively, a fresh charge of monomer could be added after the addition of the new initiator aliquot to allow polymerization of the tailored softening modifier and the completion of the polymerization of the controlled distribution block copolymer. The solvent blend of the controlled distribution block copolymer and the tailored modifier would then be terminated by the addition of an acid species and optionally hydrogenated. The resulting mixture could then be recovered from the solvent using the methods normally used to recover the controlled distribution block copolymer. As described above, this approach could result in a faster polymerization cycle time as the tailored modifier is being prepared concurrently with the base block copolymer.

d) Preparation of the Tailored Softening Modifier after the Preparation of the Last Segment of the Controlled Distribution Block Copolymer.

In this approach, the synthesis of the controlled distribution block copolymer is completed and the living chain ends of the base block copolymer are terminated optionally by coupling, protonation, reaction with a capping agent, or chain transfer to an initiating species. At this point in the preparation, polymerization is reinitiated by addition of a suitable amount of initiating agent (could be in part or in total an activated chain transfer species). Sufficient monomer is added to complete the polymerization of the tailored modifier whereupon a terminating agent is added to complete the polymerization process. This approach has advantages similar to those outlined in the first example above, with the caveat that the preparation of the controlled distribution block copolymer may be more straightforward (not contaminated with terminating agents and things of that sort). The blend of the tailored modifier and the controlled distribution block copolymer could then be recovered from the solvent using any of the methods that are standard for the recovery of the controlled distribution block copolymer.

6. Hydrogenation Step

After polymerization, both the controlled distribution block copolymer and the tailored softening modifier are hydrogenated. The preferred hydrogenation is selective hydrogenation of the diene portions of the final block copolymer and tailored softening modifier. Alternatively both the B blocks and the A blocks may be hydrogenated, or merely a portion of the B blocks may be hydrogenated. Hydrogenation generally improves thermal stability, ultraviolet light stability, oxidative stability, and, therefore, weatherability of the final polymer. A major advantage of the present invention is that the distribution agent, such as the non-chelating monoether, which is present during the initial polymerization process, does not interfere with or otherwise "poison" the hydrogenation catalyst, and thus the need for any additional removal steps is obviated.

Hydrogenation can be carried out via any of the several hydrogenation or selective hydrogenation processes known in the prior art. For example, such hydrogenation has been accomplished using methods such as those taught in, for example, U.S. Pat. Nos. 3,595,942; 3,634,549; 3,670,054; 3,700,633; and Re. 27,145, the disclosures of which are incorporated herein by reference. These methods operate to hydrogenate polymers containing aromatic or ethylenic unsaturation and are based upon operation of a suitable catalyst. Such catalyst, or catalyst precursor, preferably comprises a Group VIII metal such as nickel or cobalt which is combined with a suitable reducing agent such as an aluminum alkyl or hydride of a metal selected from Groups I-A, II-A and III-B of the Periodic Table of the Elements, particularly lithium, magnesium or aluminum. This preparation can be accomplished in a suitable solvent or diluent at a temperature from about 20° C. to about 80° C. Other catalysts that are useful include titanium based catalyst systems.

Hydrogenation can be carried out under such conditions that at least about 90 percent of the conjugated diene double bonds have been reduced, and between zero and 10 percent of the arene double bonds have been reduced. Preferred ranges are at least about 95 percent of the conjugated diene double bonds reduced, and more preferably about 98 percent of the conjugated diene double bonds are reduced. Alternatively, it is possible to hydrogenate the polymer such that aromatic unsaturation is also reduced beyond the 10 percent level mentioned above. Such exhaustive hydrogenation is usually achieved at higher temperatures. In that case, the double bonds of both the conjugated diene and arene may be reduced by 90 percent or more.

Once the hydrogenation is complete, it is preferable to extract the catalyst by stirring with the polymer solution a relatively large amount of aqueous acid (preferably 20-30 percent by weight), at a volume ratio of about 0.5 parts aqueous acid to 1 part polymer solution. Suitable acids include phosphoric acid, sulfuric acid and organic acids. This stirring is continued at about 50° C. for about 30 to about 60 minutes while sparging with a mixture of oxygen in nitrogen. Care must be exercised in this step to avoid forming an explosive mixture of oxygen and hydrocarbons.

As described above, the controlled distribution block copolymer can be independently hydrogenated, and then blended with the solution containing the tailored softening modifier prior to solvent removal, or blended post polymerization and hydrogenated in a single batch. In addition, it is possible to use an unhydrogenated tailored softening modifier with the hydrogenated controlled distribution block copolymer.

As an optional step it is also possible to functionalize both the CDBC and the TSM. In this alternative, the CDBC and TSM of the present invention may be functionalized in a number of ways. One way is by treatment with an unsaturated monomer having one or more functional groups or their derivatives, such as carboxylic acid groups and their salts, anhydrides, esters, imide groups, amide groups, and acid chlorides. The preferred monomers to be grafted onto the block copolymers are maleic anhydride, maleic acid, fumaric acid, and their derivatives. A further description of functionalizing such block copolymers can be found in Gergen et al, U.S. Pat. No. 4,578,429 and in U.S. Pat. No. 5,506,299. In another manner, the polymers of the present invention may be functionalized by grafting silicon or boron containing compounds to the polymer as taught in U.S. Pat. No. 4,882,384. In still another manner, the block copolymer of the present invention may be contacted with an alkoxy-silane compound to form silane-modified block copolymer. In yet another manner, the block copolymer of the present invention may be functionalized by grafting at least one ethylene oxide molecule to the polymer as taught in U.S. Pat. No. 4,898,914, or by reacting the polymer with carbon dioxide as taught in U.S. Pat. No. 4,970,265. Still further, the block copolymers of the present invention may be metallated as taught in U.S. Pat. Nos. 5,206,300 and 5,276,101, wherein the polymer is contacted with an alkali metal alkyl, such as a lithium alkyl. And still further, the block copolymers of the present invention may be functionalized by adding sulfonic groups to the polymer as taught in U.S. Pat. No. 5,516,831. All of the patents mentioned in this paragraph are incorporated by reference into this application.

7. Finishing Step

The last step, following all polymerization(s) as well as the hydrogenation step, is a finishing treatment to remove the final polymers from the solvent. Various means and methods are known to those skilled in the art, and include use of steam to evaporate the solvent, and coagulation of the polymer followed by filtration. The final result is a "clean" block copolymer composition useful for a wide variety of challenging applications, according to the properties thereof.

8. End-Uses and Applications

The polymer compositions of the present invention are useful in a wide variety of applications. The following is a partial list of the many potential end uses or applications: over molding, personal hygiene, molded and extruded goods, barrier films, packaging, closures such as synthetic corks and cap seals, tubing, containers including containers for food or beverages, interior automotive applications, window gaskets, oil gels, foamed products, fibers including bicomponent and monofilament, adhesives, cosmetics and medical goods.

Finally, the copolymer compositions of the present invention can be compounded with other components not adversely affecting the copolymer properties. Exemplary materials that could be used as additional components would include, without limitation, pigments, antioxidants, stabilizers, surfactants, waxes, flow promoters, traditional processing oils, solvents, particulates, and materials added to enhance processability and pellet handling of the composition. In addition, the copolymer compositions can be further formulated with other polymers, including by way of illustration and not limitation, polyolefins (e.g., propylene homopolymers and copolymers, ethylene homopolymers and copolymers and butylene homopolymers and copolymers), styrene polymers (e.g., polystyrene homopolymers, HIPS, ABS, SAN), engineering thermoplastics, polyurethanes, polyamides, polycarbonates, polyesters, functionalized polymers (e.g., maleated PP, maleated S-EB-S), styrene diene block copolymers (e.g. S—I—S, S, S—B—S, S—I/B—S) hydrogenated styrene diene block copolymers (e.g. S-EB-S, S-EP-S, S-EP, S-EB) and the like.

The following examples are intended to be illustrative only, and are not intended to be, nor should they be construed as being, limitative in any way of the scope of the present invention

EXAMPLE #1

A series of tailored softening modifiers were prepared by anionic copolymerization of styrene and butadiene in the presence of diethyl ether, a distribution control agent. The unsaturated copolymers were hydrogenated using a Ni/Al technique. A representative tailored softening modifier, TSM-6, was made under standard anionic copolymerization conditions by initiating the reaction of styrene (0.92 kg) and butadiene (0.93 kg) at 45° C. with s-butyllithium (289 ml of a 12% wt solution) in the presence of a distribution control agent, diethyl ether (9.8 kg), using cyclohexane (123 kg) as a solvent. Following the initiation of polymerization of batch charges of monomers, the remaining 6.43 kg of styrene and 11 kg of butadiene were charged at a rate of about 0.75 kg/min and 0.34 kg/min, respectively; the temperature was allowed to increase to about 60° C. When the polymerization was complete, the reaction was terminated with about 20 milliliters of methanol. The resulting unsaturated, tailored softening modifier had a molecular weight of 60.7 kg/mole, a vinyl content of 34.6% and a polystyrene content of 37.6% by $^1$H NMR. The styrene blockiness by $^1$H NMR was measured to be 11%, indicating that a substantial majority of the styrene was separated from other styrene units by at least one butadiene unit. This polymer was then hydrogenated to a residual unsaturation of 0.05 milliequivalents olefin/gram using a Ni/Al catalyst (about 20 PPM Ni) at 700 psi hydrogen, 85° C. The catalyst was oxidized and extracted by contacting the cement with aqueous phosphoric acid while sparging with an $N_2/O_2$ gas blend. The cement was then washed with distilled water (while sparging with $N_2/O_2$), and any residual acid was neutralized by sparging with ammonia. The cement was then washed with deionized water and 19 grams Irganox 1010 (0.07% wt polymer basis) was added as a stabilizer. The solids content at this point was 13% weight.

Using related anionic copolymerization techniques and hydrogenation methods but differing amounts of the reagents, the tailored softening modifiers described in Table 1 were prepared in separate reactors. TSM-1, TSM-2 and TSM-10 are tailored softening modifiers prepared in the presence of the CDBC.

TABLE 1

Tailored Softening Modifiers Prepared Separately.

| Sample | MW (kg/mol) | Vinyl (%) | PSC (% wt) | Blockiness Index (%) |
| --- | --- | --- | --- | --- |
| TSM-1 | 99 | 38 | 38 | <5 |
| TSM-2 | 65 | 38 | 38 | <5 |
| TSM-3 | 3 | 39 | 25 | 5 |
| TSM-4 | 6 | 39 | 25 | 4 |
| TSM-5 | 14 | 37 | 25 | 2 |
| TSM-6 | 61 | 35 | 38 | 11 |
| TSM-7 | 21 | 35 | 25 | 1 |
| TSM-8 | 73 | 35 | 39 | 31 |
| TSM-9* | 76 | 38 | 36 | 22 |
| TSM-10 | 56 | 25 | 38 | <5 |

TABLE 1-continued

Tailored Softening Modifiers Prepared Separately.

| Sample | MW (kg/mol) | Vinyl (%) | PSC (% wt) | Blockiness Index (%) |
| --- | --- | --- | --- | --- |
| TSM-11 | 76 | 36 | 35 | 24 |
| TSM-12 | 70 | 35 | 39 | 6 |

TSM-9* is a blend of TSM-11 and TSM-12.
where "MW" = peak molecular weight as measured by Gel Permeation Chromatography, "Vinyl" = the portion of the butadiene that was polymerized by 1,2-addition and is measured using an H-NMR method, "PSC" = styrene content of the tailored softening modifier, TSM, polymer as measured by H-NMR, and "Blockiness Index" is a measure of the styrene units having styrene nearest neighbors in the TSM polymer chain.

EXAMPLE #2A

Coupled Controlled Distribution Block Copolymer CDBC-6

Saturated controlled distribution block copolymers, CDBCs, were prepared using the procedure described in U.S. Published Patent Application 2003/0176582 A1, published Sep. 18, 2003. In a representative example (CDBC-6), anionic polymerization of styrene in a mixed diethyl ether (6% wt)/cyclohexane solvent was initiated by addition of s-BuLi (styrene/s-BuLi=9.6 (kg/mol)). When the styrene had been consumed, an aliquot of the living polymer solution was quenched and analyzed by Gel Permeation Chromatography, GPC; the molecular weight of the styrene block so prepared was 9.7 kg/mol. The living polystyrene solution was treated with a mixture of butadiene and styrene to prepare the controlled distribution copolymer block. The addition of the two monomers was staged so as to maintain a low but finite concentration of butadiene throughout the reaction. When all of the comonomers had been consumed, an aliquot of the living polymer solution was quenched and analyzed using GPC and proton NMR, (H-NMR). From these analyses, it was deduced that the controlled distribution segment had a molecular weight of 40.4 kg/mol, a styrene content of 25% wt, a butadiene 1,2-addition level of 37%, and that the styrene distribution was controlled to less than 5% blockiness. The solution of the living diblock copolymer was treated with methyltrimethoxysilane (MTMS) at a ratio of about 0.5 moles MTMS per mole polymer-Li anion, to couple the living chains. After the coupling reaction had been allowed to proceed for 15 minutes, the living polymer solution was treated with MeOH (about 10% molar basis the initial s-BuLi charge) to terminate the living chain ends that may not have reacted with the coupling agent. Analysis of the terminated polymer solution by GPC indicated that about 90% of the living diblock chains had coupled, of these about 94% were linear, with the remainder being primarily 3-arm radial polymer.

The polymer cement was hydrogenated using a Co/Al technique to a residual unsaturation of <0.1 meq/g in the butadiene portion of the polymer. The hydrogenation catalyst was extracted into an aqueous phosphoric acid solution after oxidation with a mixture of air and nitrogen. The resulting polymer solution was contacted with an excess of ammonia to neutralize entrained phosphoric acid, and the solvent was removed to recover the polymer.

EXAMPLE #2B

CDBC-1 Followed by Manufacture of TSM-1

In this example (CDBC-1), anionic polymerization of styrene in a mixed diethyl ether (6% wt)/cyclohexane solvent was initiated by addition of s-BuLi (styrene/s-BuLi=29.0 (kg/mol)). When the styrene had been consumed, an aliquot of the living polymer solution was quenched and analyzed by Gel Permeation Chromatography, GPC; the molecular weight of the styrene block so prepared was 30.1 kg/mol. The living polystyrene solution was treated with a mixture of butadiene and styrene to prepare the controlled distribution copolymer block. The addition of the two monomers was staged so as to maintain a low but finite concentration of butadiene throughout the reaction. When all of the comonomers had been consumed, an aliquot of the living polymer solution was quenched and analyzed using GPC and proton NMR, H-NMR. From these analyses, it was deduced that the controlled distribution segment had a molecular weight of 78.9 kg/mol, a styrene content of 38% wt, a butadiene 1,2-addition level of 35%, and that the styrene distribution was controlled to less than 5% blockiness. The solution of the living diblock copolymer was treated with methyltrimethoxysilane (MTMS) at a ratio of about 0.5 moles MTMS per mole polymer-Li anion, to couple the living chains. After the coupling reaction had been allowed to proceed for 30 minutes, the living polymer solution was treated with MeOH (about 10% molar basis the initial s-BuLi charge) to terminate the living chain ends that may not have reacted with the coupling agent. Analysis of the terminated polymer solution by GPC indicated that about 90% of the living diblock chains had coupled, of these about 97% were linear, with the remainder being 3-arm radial polymer.

In this example, the tailored softening modifier (TSM-1) was prepared in the same reactor. A fraction of the butadiene and all of the desired styrene were added to the terminated cement prepared above. Excess methanol was titrated; s-butyllithium solution was slowly added until spectroscopic analysis indicated the onset of color, and then polymerization was initiated by addition of s-BuLi (styrene+total butadiene/s-BuLi=45.0 (kg/mol)). The remaining butadiene was added at such a rate as to maintain a low but finite concentration of butadiene throughout the reaction. When all of the monomers had been consumed, the reaction was terminated by the addition of methanol (about 10% molar excess based on the second butyllithium charge). The monomers added in this second polymerization were expected to yield a TSM of about 45 kg/mole comprised of 38% styrene; little to none of the styrene was expected to polymerize in a blocky manner. The ratio of the two initiation charges was expected to produce a final polymer composition comprised of roughly 33% TSM/77% CDBC. While the H NMR analysis of the product was consistent with this conclusion, GPC of the product indicated that the majority of the TSM chains had reached a much higher MW (roughly 99 kg/mole), and roughly ⅓ of the chains had grafted onto the CDBC chains at some point, fairly late in their propagation, via reaction with the remaining Si-methoxy group of the linearly-coupled chains.

The polymer cement was then hydrogenated using a Co/Al technique to a residual unsaturation of 0.3 meq/g in the butadiene portion of the polymer. The hydrogenation catalyst was extracted into an aqueous phosphoric acid solution after oxidation with a mixture of air and nitrogen. The resulting polymer solution was contacted with an excess of ammonia to neutralize entrained phosphoric acid and the solvent was removed to recover the polymer.

EXAMPLE #2C

Sequential Controlled Distribution Block Copolymers CDBC-4

In a representative example (CDBC-4), anionic polymerization of styrene in a mixed diethyl ether (6% wt)/cyclohexane solvent was initiated by addition of s-BuLi (styrene/s-BuLi=28 (kg/mol)). When the styrene had been consumed, an aliquot of the living polymer solution was quenched and analyzed by Gel Permeation Chromatography, GPC; the molecular weight of the styrene block so prepared was 28.8 kg/mol. The living polystyrene solution was treated with a mixture of butadiene and styrene to prepare the controlled distribution copolymer block. The addition of the two monomers was staged so as to maintain a low but finite concentration of butadiene throughout the reaction. When all of the comonomers had been consumed, an aliquot of the living polymer solution was quenched and analyzed using GPC and proton NMR, H-NMR. From these analyses, it was deduced that the controlled distribution segment had a molecular weight of 129.7 kg/mol, a styrene content of 38% wt, a butadiene 1,2-addition level of 36%, and that the styrene distribution was controlled to less than 1% blockiness. The solution of the living diblock copolymer was treated with additional styrene monomer to make the block copolymer segment. When all of the monomer had been consumed, the living polymer solution was treated with MeOH (10% molar excess basis the initial s-BuLi charge) to terminate the living chain ends. Analysis of the terminated polymer solution by GPC and H-NMR allowed the discovery that the final styrene block molecular weight was 31.1 kg/mol and styrene content of the polymer was 59% wt.

The polymer cement was hydrogenated using a Co/Al technique to a residual unsaturation of <0.3 meq/g in the butadiene portion of the polymer. The hydrogenation catalyst was extracted into an aqueous phosphoric acid solution after oxidation with a mixture of air and nitrogen. The resulting polymer solution was contacted with an excess of ammonia to neutralize entrained phosphoric acid and the solvent was removed to recover the polymer.

EXAMPLE #2D

Sequential Controlled Distribution Block Copolymer (CDBC-2), Followed by TSM-2

The saturated controlled distribution block copolymer, CDBC-2, was prepared using the procedure described in U.S. Published Patent Application 2003/0176582 A1, published Sep. 18, 2003. In this example, anionic polymerization of styrene in a mixed diethyl ether (6% wt)/cyclohexane solvent was initiated by addition of s-BuLi (styrene/s-BuLi=29.0 (kg/mol)). When the styrene had been consumed, an aliquot of the living polymer solution was quenched and analyzed by Gel Permeation Chromatography, GPC; the molecular weight of the styrene block so prepared was 28.2 kg/mol. The living polystyrene solution was treated with a mixture of butadiene and styrene to prepare the controlled distribution copolymer block. The addition of the two monomers was staged so as to maintain a low but finite concentration of butadiene throughout the reaction. When all of the comonomers had been consumed, an aliquot of the living polymer solution was quenched and analyzed using GPC and proton NMR, H-NMR. From these analyses, it was deduced that the controlled distribution segment had a molecular weight of 144.1 kg/mol, a styrene content of 38% wt, a butadiene 1,2-addition level of 34%, and that the styrene distribution was controlled to about 1% blockiness. The solution of the living diblock copolymer was treated with additional styrene monomer to make the block copolymer segment. When all of the monomer had been consumed, the living polymer solution was treated with about one equivalent of MeOH to terminate the living chain ends. Analysis of the terminated polymer solution by GPC and H-NMR allowed the discovery that the final styrene block molecular weight was 37.7 kg/mol and styrene content of the polymer was 57% wt.

In this example, the tailored softening modifier (TSM-2) was prepared in the same reactor after polymerization of the CDBC. A fraction of the butadiene and all of the desired styrene were added to the terminated cement prepared above. Excess methanol was titrated; s-butyllithium solution was slowly added until spectroscopic analysis indicated the onset of color, and then polymerization was initiated by addition of s-BuLi (styrene+total butadiene/s-BuLi=38.4 (kg/mol)). The remaining butadiene was added at such a rate as to maintain a low but finite concentration of butadiene throughout the reaction. When all of the monomers had been consumed, the reaction was terminated by the addition of methanol (about 10% molar excess based on the second butyllithium charge). The monomers added in this second polymerization were expected to yield a TSM of about 39 k/mole comprised of 38% styrene; little to none of the styrene was expected to polymerize in a blocky manner. The ratio of the two initiation charges was expected to produce a final polymer composition comprised of roughly 33% TSM/77% CDBC. H NMR analysis of the product was consistent with this conclusion. GPC of the product indicated that the TSM chains had reached a somewhat higher MW of 65.4 kg/mole.

The polymer cement was hydrogenated using a Co/Al technique to a residual unsaturation of about 0.07 meq/g in the butadiene portion of the polymer. The hydrogenation catalyst was extracted into an aqueous phosphoric acid solution after oxidation with a mixture of air and nitrogen. The resulting polymer solution was contacted with an excess of ammonia to neutralize entrained phosphoric acid and the solvent was removed to recover the polymer.

EXAMPLE #3

Additional controlled distribution block copolymers were prepared using related synthesis techniques. All the controlled distribution block copolymers of Example 2 and other similar block copolymers are described below in Table 2 "SI" refers to the molecular weight of the A end block. "SII" refers to the molecular weight of the A-B diblock. SIII refers to the molecular weight of an A-B-A block copolymer if linear sequential polymerization is used and $(A-B)_nX$ block copolymer if a coupling polymerization is used.

TABLE #2

| CDBC | SI (kg/mole) | SII[1] (kg/mole) | SIII[1,2] (kg/mole) | Overall PSC | Midblock PSC | Midblock Blockiness | Coupling Efficiency |
|---|---|---|---|---|---|---|---|
| 1 | 30.1 | 109.0 | 217.2 | 58% | 38% | 4% | 90% |
| 2 | 28.2 | 172.3 | 210.0 | 57% | 38% | 1% | NA[3] |
| 3 | 9.3 | 88.3 | 97.7 | 41% | 25% | <1% | NA[3] |
| 4 | 28.8 | 158.5 | 189.6 | 59% | 38% | <1% | NA[3] |
| 5 | 28.7 | 169.3 | 200.9 | 58% | 38% | <1% | NA[3] |
| 6 | 9.7 | 50.1 | 101.2 | 40% | 25% | 5% | 92% |
| 7 | 28.2 | 156.3 | 186.9 | 59% | 37% | 2% | NA[3] |
| 8 | 29.0 | 179.7 | 221.6 | 58% | 38% | 5% | NA[3] |

[1]True MW, cumulative.
[2]Linear (n = 2) peak for coupled polymers $(S-EB/S))_nX$.
[3]Linear sequential polymer.

Various blends of Tailored Softening Modifiers and Controlled Distribution Block Copolymers were prepared according to the following general procedure: The specified quantity of CDBC polymer and TSM were added to a Cowles high shear dissolver, along with a certain amount of cyclohexane, in order to form a solution containing about 14% weight solids. The resulting mixture was then heated to about 90° C., and allowed to mix at about 1400 RPM for 60 to 120 minutes. The solvent was then stripped in a cyclone and the blend recovered as crumb. The resulting blends are shown below in Table #3, and are then used in the following examples:

TABLE #3

| Blend# | CDBC# | TSM# | TSM (phr) |
|---|---|---|---|
| 1 | 1 | 1 | 50 |
| 2 | 2 | 2 | 50 |
| 3 | 3 | 3 | 25 |
| 4 | 3 | 4 | 25 |
| 5 | 3 | 5 | 25 |
| 6 | 4 | 3 | 25 |
| 7 | 4 | 4 | 25 |
| 8 | 4 | 5 | 25 |
| 9 | 5 | 6 | 25 |
| 10 | 6 | 7 | 80 |
| 11 | 7 | 6 | 50 |
| 12 | 7 | 6 | 100 |
| 13 | 4 | 8 | 50 |
| 14 | 4 | 9 | 50 |
| 15 | 8 | 10 | 50 |

The following materials were used in the examples that follow:

FG-1901X—Selectively hydrogenated S-EB-S block copolymer with 30% styrene content and functionalized with ~1.5 wt % maleic anhydride as supplied by KRATON Polymers.

G-1650—Selectively hydrogenated S-EB-S block copolymer with 30% w. styrene content as supplied by KRATON Polymers G-1651—Selectively hydrogenated S-EB-S block copolymer with 33% w. styrene content as supplied by KRATON Polymers.

PW90—Paraffinic oil supplied by Idemitsu Oil.

Drakeol 34—Paraffinic oil supplied by Penreco.

HPP-6331—homopolypropylene with a melt flow of 14 g/10 min supplied by Taiwan Polypropylene.
TPS—Toyo Stylole H700 toughened polystyrene with a melt index of 11 g/10 min supplied by Toyo Styrene.
TPEE—Hytrel 4057 thermoplastic polyester elastomer with a melt index of 13 g/10 min supplied by Toray DuPont.
TPU—Elastollan 1180A thermoplastic polyurethane with a Shore A hardness of 80 supplied by BASF.
Irganox B225—Antioxidant supplied by Ciba Specialty Chemicals.
Kristalex 5140—End block resin supplied by Eastman.
ABS—GR1000 acrylonitrile-butadiene-styrene copolymer with a melt index of 20 g/10 min supplied by Denki Kagaku Kogyo.
MMA-ABS—CL301 transparent ABS with a melt index of 26 g/10 min supplied by Denki Kagaku Kogyo.
N 6—Ultramid B3K Nylon 6 supplied by BASF.
PC—Lexan 141R-111 polycarbonate supplied by GE Plastics.

EXAMPLE #4

In this example the utility of tailored softening modifiers is compared to that of traditional oils. All samples were prepared by solution blending controlled distribution polymers with 20 wt % of a tailored softening modifier or traditional oil as indicated in cyclohexane. Films were cast from solution in Teflon coated pans. The CDBC-4 control was solvent cast on a pool of glycerin to prevent residual stress build-up. Tensile testing was performed using a miniature dog-bone shaped specimen with a gage length of 1 inch and a crosshead speed of 2 in/min. Stress relaxation tests were performed at 50% strain and 100° F. for 30 minutes on a straight strip specimen with a 3 inch gage length and 0.5 inch width. Order-disorder-transition (ODT) temperatures were measured using dynamic mechanical analysis (DMA). Temperature sweeps were performed over various frequencies. The ODT is identified as the temperature where complex viscosity collapses to a single value independent of frequency. Weight loss was measured using thermogravimetric analysis (TGA) under isothermal conditions at 250° C. under a Nitrogen blanket.

The use of tailored softening modifiers result in blends that have essentially the same moduli as those softened with traditional oils (Drakeol 34 and Renoil 471). The tensile properties of the blends that utilize tailored softening modifiers with molecular weights less than about 6,100 g/mol are equivalent to blends that contain traditional oils. However they have the added advantage of reduced volatility as illustrated by the weight loss measured at 250° C. As shown in Table #4, Blends 3-5 each exhibit less than 1% weight loss over an hour at 250° C. whereas the blends containing Drakeol 34 and Renoil 471 lose 6% and 16%, respectively. This reduction in volatility translates to significant reductions in fogging and smoke generation during processing. In addition, the use of tailored softening modifiers does not reduce the ODT akin to traditional oils. The ODT is the characteristic temperature at which phase separation is no longer persistent; a block copolymer is homogeneous viscous liquid above its ODT. As a result, a higher ODT correspond to improved upper service temperature performance due to the persistence of phase separation at higher temperatures.

As shown in Table 5, as the molecular weight of the tailored softening modifier increases above about 6,100 g/mol, surprisingly the tensile strength increases higher than that achieved using traditional oils. In addition, the use of tailored softening modifiers results in improved stress relaxation as compared to traditional oils. The percent stress relaxation for a controlled distribution block copolymer with 20 w % of a tailored softening modifier is essentially the same as that for the neat material. Addition of 20 w % traditional oil (100 parts of CDBC and 25 parts oil) results in approximately 25% increase in stress relaxation.

TABLE #4

| | Sample | | | | | |
|---|---|---|---|---|---|---|
| | CDBC-3 | CDBC-3 Drakeol | CDBC-3 Renoil | | | |
| | CDBC-3 | 34 | 471 | Blend 3 | Blend 4 | Blend 5 |
| Softener MW | — | 400-600 | 400-600 | 3038 | 6070 | 13800 |
| 50% Modulus | 186 | 113 | 113 | 110 | 112 | 116 |
| 100% Modulus | 255 | 157 | 161 | 154 | 155 | 161 |
| 300% Modulus | 646 | 325 | 359 | 326 | 328 | 345 |
| 500% Modulus | 1617 | 683 | 866 | 700 | 705 | 770 |
| Tensile Strength | 3960 | 3040 | 3230 | 3215 | 3220 | 3535 |
| Tensile St Dev | 162 | 240 | 332 | 141 | 220 | 105 |
| Elongation | 689 | 912 | 847 | 869 | 863 | 868 |
| Elongation St Dev | 19 | 3 | 15 | 3 | 8 | 10 |
| 50% Stress Relaxation, % | 18 | 22 | N/W | N/W | N/W | 17 |
| ODT, ° C. | 250 | 170 | 170 | 230 | 240 | 260 |
| 60 min Weight Loss, % | 0.1 | 5.9 | 16.5 | 0.3 | 0.6 | 0.4 |

TABLE #5

| | CDBC-4 | CDBC-4 Renoil 471 | Blend 6 | Blend 7 | Blend 8 | Blend 9 |
|---|---|---|---|---|---|---|
| Softener MW | — | 400-600 | 3038 | 6070 | 13800 | 60000 |
| 50% Modulus | 299 | 68 | 51 | 62 | 63 | 136 |
| 100% Modulus | 386 | 87 | 72 | 81 | 83 | 162 |
| 300% Modulus | 931 | 176 | 137 | 143 | 151 | 349 |
| 500% Modulus | 2268 | 339 | 258 | 255 | 287 | 424 |
| Tensile Strength | 4500 | 3290 | 2770 | 2515 | 3470 | 3445 |
| Tensile St Dev | 697 | 287 | 310 | 325 | 177 | 58 |
| Elongation | 701 | 1150 | 1128 | 1107 | 1158 | 1152 |
| Elongation St Dev | 44 | 26 | 67 | 53 | 50 | 31 |

EXAMPLE #5

This example illustrates a reduction in $CO_2$ and $O_2$ permeability coefficients for controlled distribution block copolymers that contain a tailored softening modifier as compared to traditional oils. Three formulated samples were prepared by solution blending the polymer (CDBC-3) indicated with 20 wt % modifier (Blend #4) or traditional oil (Renoil 471 or Drakeol 34) in cyclohexane. Films were cast from solution to approximately 10 mil thickness. $CO_2$ and $O_2$ transmission rates were tested using a MOCON apparatus at 23° C. and 0% relative humidity. Side 1 of the barrier was exposed to 760 mm Hg of 100% $CO_2$ or $O_2$ while side 2 of the barrier initially experienced 760 mm Hg of 100% $N_2$. Two traditional oils were used for comparison. Drakeol 34 and Renoil 471 are paraffinic and naphthenic oils, respectively.

As illustrated in FIG. 1, the addition of traditional oils (Renoil 471 and Drakeol 34) to a controlled distribution block copolymer result in an increase in the $CO_2$ and $O_2$ permeability coefficients. The increase in $CO_2$ permeability coefficient is significantly more pronounced. The increase in permeability coefficient due to incorporation of paraffinic oil is most pronounced. The use of a tailored softening modifier reduces hardness similarly to traditional oils without increasing the $CO_2$ and $O_2$ permeability coefficients. Surprisingly, the $CO_2$ and $O_2$ permeability coefficients are the same as the neat controlled distribution copolymer within experimental error.

EXAMPLE #6

In this example the use of a tailored softening modifier is compared to the use of traditional oil in a compounded formulation. All formulations were compounded on a twin-screw extruder. Amounts listed in Table #6 are listed as parts by weight. Injection molded plaques (2 mm thick) were generated for testing purposes. The control formulation is based on a commercial S-EB-S polymer of similar molecular weight and illustrates a property set useful for general molded and extruded goods with moderate physical property requirements. For many applications higher tensile and tear strengths are desirable. One way of improving these properties is to use a controlled distribution polymer of similar molecular weight. Formulation 6.1 demonstrates a 33% improvement in tensile strength and an 11% improvement in tear strength due to the use of a controlled distribution polymer and traditional oil. Surprising further improvements can be realized by utilizing a controlled distribution polymer in conjunction with a tailored softening modifier as illustrated by Formulation 6.2 where a 208% and a 33% improvement in tensile and tear strengths, respectively, are observed relative to the traditional S-EB-S control formulation. This level of improvement is significant and unique since the formulations are of identical hardness. In addition, the use of a tailored softening modifier in formulation 6.2 significantly improves the barrier performance of the formulation. The carbon dioxide permeability coefficient is reduced by 64% while the oxygen permeability coefficient is 44% lower when the TSM is used.

TABLE #6

| | Formulation | | |
|---|---|---|---|
| | Control | 6.1 | 6.2 |
| G1650 | 100 | | |
| CDBC-3 | | 100 | |
| Blend 10 | | | 180 |
| Drakeol 34 | 83 | 80 | |
| Dow 5E12 PP | 41.5 | 55 | 55 |
| Irganox 1010 | 0.3 | 0.3 | 0.3 |
| Shore A Hardness, 10s | 64 | 67 | 64 |
| MD Tensile Properties | | | |
| 100% Modulus, psi | 460 | 500 | 540 |
| 300% Modulus, psi | 655 | 660 | 780 |
| Strength, psi | 930 | 1240 | 1940 |
| Elongation, % | 540 | 615 | 650 |
| MD Tear Strength, pli | 248 | 276 | 330 |
| Compression set | | | |
| 25° C./22 hrs, % | 21 | 28 | 28 |
| 70° C./22 hrs, % | 97 | 96 | 93 |
| Melt flow @ 200/5 kg | 70 | 152 | 18 |
| Permeability Coefficient [1E-12 (cc x cm)/(cm^2 x s x Pa)] | | | |
| $CO_2$ | 6.95 | | 2.5 |
| $O_2$ | 1.7 | | 0.75 |

EXAMPLE #7

A major application of styrenic block copolymer compounds is overmolding onto rigid substrates to provide a soft-touch feel and tailored appearance. Examples of rigid substrates include ABS (acrylonitrile/butadiene/styrene terpolymers), PC (polycarbonate), Polyamide, etc. Of these, ABS is one of the most difficult on which to achieve high levels of adhesion with cohesive failure. It has been found that partial replacement of the traditional oil by a tailored softening modifier in formulations containing controlled distribution polymers significantly improves overmold adhesion on a variety of substrates.

In this example, the overmold adhesion is compared for formulations based on a controlled distribution polymer containing a tailored softening modifier versus traditional oil. All compounds were prepared by twin-screw extrusion using techniques to those skilled in the art. Compound melt flow rate was tested according to ASTM D1238 at 230° C./2.16 kg. All compounds and rigid substrate materials were dried overnight prior to injection molding. Data in Table #7 corresponds to specimens 25 mm wide that were injection molded so that the soft compound layer is "on top" of the rigid substrate resulting in an over-under configuration. Overmold adhesion was testing in a 180° peel test configuration according to JIS K6854 with a crosshead speed of 200 mm/min. In this type of adhesion test an average peeling strength≧100 N/25 mm is considered to demonstrate excellent adhesion. Shore A hardness was testing according to ASTM D2240 at 0 and 30 seconds. Data in Table #7 corresponds to specimens tested by the Renault D41 1916 method where the rigid substrate and the overmold are injected side-by-side resulting in a butt-joint configuration with a 2 mm wide contact surface. Peel adhesion was measured using a 90° peel test with a moving clamp. Average peeling forces of approximately 10 N are considered to demonstrate good overmold adhesion in the Renault test.

Formulation 25 represents typical art prior to this invention. Known overmolding formulations for these types of substrates typically include a high molecular weight SEBS polymer in conjunction with a maleated SEBS or maleated polyolefin. Oil and endblock resin are also common ingredients to improve flow for enhanced surface wetting. These known formulations do not have extraordinary overmold adhesion onto substrates like ABS (acrylonitrile/butadiene/styrene terpolymers) and PC (polycarbonate). In this example, controlled distribution polymers in conjunction with tailored softening modifiers have been shown to have extraordinarily good overmold adhesion on both ABS and PC according to the two test methods employed.

Relative to Formulation 25, the use of controlled distribution polymers in conjunction with tailored softening modifiers improve average peel strength significantly on ABS, MMA-ABS, and PC as demonstrated by formulations 1, 9, 11, 15, 20, and 21 in Tables 7 and 8. Thermoplastic copolyesters and thermoplastic polyurethanes can also be utilized in conjunction with the modified controlled distribution polymers to enhance adhesion. The fact that these formulations demonstrate good adhesion in both the butt-joint configuration and the over-under configuration illustrates their versatility. The use of a controlled distribution polymer in conjunction with traditional oil only does not significantly improve overmold adhesion relative to Formulation 25. Maleated SEBS or maleated polyolefins can also be used in conjunction with the modified controlled distribution polymer to provide enhanced adhesion onto polyamides as demonstrated by formulations 13 and 14.

TABLE #7

| | | Formulation | | | | | | | | | | | |
|---|---|---|---|---|---|---|---|---|---|---|---|---|---|
| | | 1 | 2 | 9 | 10 | 11 | 12 | 13 | 14 | 15 | 16 | 20 | 21 | 25 |
| G1651 | | | | | | | | | | | | | | 30 |
| FG1901X | | | | | | | | 30 | 30 | | | | | 70 |
| Blend 11 | | 150 | | 150 | | 150 | | 105 | 105 | | | | | |
| Blend 12 | | | | | | | | | | 200 | | 200 | 200 | |
| CD-4 | | | 100 | | 100 | | 100 | | | | 100 | | | |
| PW90 | | 50 | 100 | 50 | 100 | 50 | 100 | 50 | 50 | 50 | 150 | 50 | 50 | |
| Drakeol 34 | | | | | | | | | | | | | | 100 |
| HPP (6331) | | | | | | | | | | | | | | 20 |
| TPS (Toyo HI H700) | | 34 | 34 | | | | | | | 34 | 34 | | | |
| Kristalex5140 | | | | | | | | | | | | | | 20 |
| TPEE (Hytrel4057/TD) | | | | 50 | 50 | | | 50 | | | | 50 | | |
| TPU(Elastllan1180A/BASF) | | | | | | 50 | 50 | | 50 | | | | 50 | |
| IrganoxB225 | | 0.4 | 0.4 | 0.4 | 0.4 | 0.4 | 0.4 | 0.4 | 0.4 | 0.4 | 0.4 | 0.4 | 0.4 | 0.8 |
| Test Results | | | | | | | | | | | | | | |
| ShoreA(0 s) | | 42 | 27 | 39 | 32 | 38 | 28 | 45 | 42 | 37 | 10 | 38 | 36 | 41 |
| ShoreA(30 s) | | 35 | 27 | 35 | 31 | 33 | 27 | 42 | 39 | 28 | 10 | 32 | 29 | 38 |
| MI (230 C., 2.16 kg) | | 0.1 | 0.8 | 0.7 | 3.4 | 1.0 | 9.1 | 2.6 | 4.6 | 1.5 | 5.0 | 4.5 | 4.7 | |
| 180° C. peel (N/25 mm) | peak max | 78 | — | 107 | 65 | 78 | — | 118 | 98 | 88 | — | 115 | 80 | 61 |
| onto ABS | avarage | 70 | <30 | 104 | 62 | 78 | <30 | 95 | 95 | 82 | <30 | 114 | 79 | 56 |
| 180° C. peel (N/25 mm) | peak max | 142 | 43 | 108 | 64 | 84 | — | 104 | 108 | 115 | — | 108 | 88 | 73 |
| onto MMA-ABS | avarage | 117 | 38 | 108 | 62 | 83 | <30 | 100 | 101 | 106 | <20 | 103 | 83 | 64 |
| 180° C. peel (N/25 mm) | peak max | — | — | 32.8 | — | 76 | 38 | 48 | 76 | — | — | 33 | 79 | 40 |
| onto N6 | average | <10 | <10 | <20 | <10 | 72 | 29 | 39 US | 71 | <10 | <5 | 24 US | 71 | 26 US |
| 180° C. peel (N/25 mm) | peak max | 80 | — | 106 | 60 | 75 | 32 | 96 | 94 | 85 | — | 125 | 86 | 51 |
| onto PC | average | 60 | <20 | 99 | 38 | 70 | 25 | 90 | 84 | 73 | <10 | 121 MF | 72 | 42 |

US: Unstable Adhesion
MF: Material Failure

TABLE #8

| | | Formulation | | | |
|---|---|---|---|---|---|
| | | 1 | 9 | 15 | 20 |
| Adhesion onto: ABS | | | | | |
| Average peeling Force | N | 6.5 | 17 | 8 | 16 |
| Fmax | N | 8 | 18 | 9.5 | 17 |
| Failure mode | | Adh. Fail. | Adh. Fail. | Adh. Fail. | Adh. Fail. |
| MMA-ABS | | | | | |
| Average peeling Force | N | 11 | 18 | 18 | 23 |
| Fmax | N | 12.5 | 19 | 20 | 27 |

TABLE #8-continued

|  |  | Formulation | | | |
| --- | --- | --- | --- | --- | --- |
|  |  | 1 | 9 | 15 | 20 |
| Failure mode |  | Adh. Fail. | Adh. Fail. | Adh. Fail. | Part. Coh. |
| PC |  |  |  |  |  |
| Average peeling Force | N | 8 | 16 | 13.5 | 15 |
| Fmax | N | 10 | 17 | 15 | 16 |
| Failure mode |  | Adh. Fail. | Adh. Fail. | Adh. Fail. | Adh. Fail. |
| Physical properties* |  |  |  |  |  |
| Modulus 100% | MPa | 1.6 | 1 | 1 | 1 |
| Tensile Strength | MPa | 4.8 | 4 | 3.5 | 4.9 |
| Elongation at break | % | 350 | 590 | 360 | 510 |
| Hardness Shore A, 30 sec | — | 41 | 41 | 31 | 33 |

EXAMPLE #8

This example illustrates an improvement in compression set at elevated temperature comparing the use of equivalent amounts of a tailored softening modifier and traditional oil in conjunction with a controlled distribution polymer. Both formulations were mixed using a Brabender mixing head with a melt temperature of ~220° C. for 4-5 min. Samples were then compression molded at 190° C. for 2 min to provide 2 mm thick plaques. Addition of 50 phr of a tailored softening modifier to CDBC-4 improves compression set at 70° C. without any significant reduction in other properties. Hardness of the formulation is slightly higher than the control containing traditional oil only. As a result, use of a tailored softening modifier results in improved overmold adhesion (from previous example) as well as improved compression set at elevated temperature.

TABLE #9

|  | Formulation | |
| --- | --- | --- |
|  | 26 | 27 |
| CDBC-4 | 100 |  |
| Blend 11 |  | 150 |
| Drakeol 34 | 100 | 50 |
| MC3600 (13 MF PS) | 34 | 34 |
| Hardness, 30 sec | 18 | 30 |
| Tensile Properties |  |  |
| 100% Mod, psi | 30 | 60 |
| 300% Mod, psi | 115 | 225 |
| Strength, psi | 1200 | 1195 |
| Elongation, % | 730 | 620 |
| Tear Strength, pli | 82 | 83 |
| Compression Set, % |  |  |
| 25° C./22 hrs | 8 | 9 |
| 70° C./22 hrs | 27 | 15 |

EXAMPLE #9

This example illustrates the effectiveness of a controlled distribution polymer in conjunction with a tailored softening modifier for highly elastic applications. Strands of molten polymer were produced using a melt indexer at 230° C. and 2.16 kg. Hysteresis and stress-relaxation were measured on the polymer strands. Second cycle hysteresis permanent set was measured using a 5 cm gage length and a test speed of 500 mm/min. The samples were elongated to 120% and immediately relaxed to zero stress. A second cycle was started immediately, extending the sample to 120% again and unloading. The third cycle is then started after a waiting time of 1 minute. Permanent set is measured as the difference between the sample length before the third cycle and the start of the test.

Stress-relaxation was measured using a Zwick mechanical tester. Strands were elongated to 50% extension in a hot air oven at 40° C. The samples were held at 50% extension for 2 hours. The force decay is recorded and stress relaxation is expressed as the ratio between the final and initial force.

The elastic performance of Blend 10 is significantly improved over CDBC-3. Addition of a tailored softening modifier greatly improves flow, reduces hardness, and results in surprisingly better stress relaxation performance. Data below indicates a 50% reduction in permanent set and a 20% improvement in stress relaxation. It should also be noted that the modified polymer has a significant increase in melt flow rate as well as lower modulus due to the incorporation of the tailored softening modifier. All of these performance attributes make the modified polymer particularly attractive for personal hygiene applications including non-wovens, elastic film, and fibers.

TABLE #10

|  |  | Sample | |
| --- | --- | --- | --- |
|  |  | CDBC-3 | Blend 10 |
| Amounts, parts by weight |  | 100 | 100 |
| MFR (230° C./2.16 kg) | g/10 | 1 | 16 |
| Second Cycle Hysteresis Permanent Set | % | 6 | 3 |
| Modulus 50%, 40° C., t (0) | MPa | 1.98 | 0.43 |
| Modulus 50%, 40° C., t (2 h) | MPa | 1.25 | 0.33 |
| F(t)/F(0) | % | 63 | 76 |

EXAMPLE #10

This example demonstrates similar performance for Blends 1 and 2 that contain TSM-1 and TSM-2, respectively. In both cases, the TSM was polymerized in the same reactor after polymerization of CDBC-1 and CDBC-2. CDBC-1 is of the $(A-B)_nX$ type whereas CDBC-2 has an A-B-A structure. Step I molecular weights and styrene contents are similar for CDBC-1 and CDBC-2. Tensile properties were measured on solution cast films from toluene. Table #11 demonstrates similar tensile performance for both blends regardless of the synthetic route.

TABLE #11

|  | Blend 1 | Blend 2 |
| --- | --- | --- |
| 100% Modulus, psi | 400 | 315 |
| 300% Modulus, psi | 590 | 565 |
| Tensile Strength, psi | 2800 | 3200 |
| Elongation, % | 980 | 1050 |

EXAMPLE #11

Compression molded plaques of blends 13, 14, and 15 were prepared at 230° C. Plaques were 4 mm in thickness. Shore A Hardness was measured at a 10 second delay. Transparency was measured on a Haze-gard plus from BYK Gardner calibrated at 0% light transmittance and 100% light transmittance. Shear viscosity was measured at 3 s⁻¹ in a capillary rheometer at 230° C. The CDBCs used in each blend have midblock blockiness values of 5% or less.

Blends 13 and 15 were tested and found to have good overmolding adhesion as described in Example #7. In addition, the blockiness index of the TSM compared to the blockiness index the B block of the CDBC ($I_2/I_1$) effects hardness, viscosity, and transparency. As the TSM blockiness index decreases, the shear viscosity and hardness decrease substantially. Also as the TSM blockiness index decreases optical transparency increases as illustrated below where Blend 15 has 15% transparency with <5% TSM blockiness while Blends 13 and 14 have ≦55% transparency with higher TSM blockiness values.

TABLE #12

| Blend # | Shore A Hardness (10s) | Transparency (%) | Shear Viscosity @ 230 C. | TSM Blockiness Index (%) |
|---|---|---|---|---|
| 13 | 68 | 54 | 34,400 | 31 |
| 14 | 55 | 55 | 21,200 | 22 |
| 15 | 47 | 78 | 16,700 | <5 |

What is claimed is:

1. A block copolymer composition comprising:
   (a) 100 parts by weight of a solid hydrogenated controlled distribution block copolymer having the general configuration A-B, A-B-A, (A-B)$_n$, (A-B-A)$_n$, (A-B-A)$_n$X, (A-B)$_n$X or mixtures thereof, where n is an integer from 2 to about 30, and X is coupling agent residue and wherein:
      i. prior to hydrogenation each A block is a mono alkenyl arene polymer block and each B block is a controlled distribution copolymer block of at least one conjugated diene and at least one mono alkenyl arene having a blockiness index ($I_1$) of less than about 40 percent;
      ii. subsequent to hydrogenation about 0-10% of the arene double bonds have been reduced, and at least about 90% of the conjugated diene double bonds have been reduced;
      iii. each A block having a peak molecular weight between about 3,000 and about 60,000 and each B block having a peak molecular weight (MW$_1$) between about 30,000 and about 300,000;
      iv. each B block comprises terminal regions adjacent to the A blocks that are rich in conjugated diene units and one or more regions not adjacent to the A blocks that are rich in mono alkenyl arene units;
      v. the total amount of mono alkenyl arene in the hydrogenated block copolymer is about 20 percent weight to about 80 percent weight; and
      vi. the weight percent of mono alkenyl arene in each B block (S$_1$) is between about 5 percent and about 75 percent; and
   (b) 5 to 250 parts by weight of a hydrogenated tailored softening modifier which is structurally related to the character of the B block of said controlled distribution block copolymer wherein:
      i. said softening modifier contains at least one conjugated diene and at least one mono alkenyl arene having a blockiness index $I_2$, such that the ratio of $I_2/I_1$ is between 0.1 and 10.0;
      ii. subsequent to hydrogenation about 0-10% of the arene double bonds have been reduced, and at least about 90% of the conjugated diene double bonds have been reduced;
      iii. the ratio (MW$_2$)/(MW$_1$) of the peak molecular weight of said softening modifier (MW$_2$) to the peak molecular weight of said B block of said controlled distribution block copolymer (MW$_1$) is 0.01 to 1.0, with a minimum molecular weight (MW$_2$) of 2,000;
      iv. the weight percent of mono alkenyl arene in each softening modifier (S$_2$) is between about 5 percent and about 75 percent and the ratio of S$_2$/S$_1$ is between 0.5 and 1.5; and
   (c) wherein said softening modifier is formed in solution in the presence of a solvent in a second reactor to form a second solution and combined with a first solution prepared in a first reactor to form a common solution, wherein said controlled distribution block copolymer is polymerized in said first solution or said common solution, and
   (d) the solvent is removed from the common solution subsequent polymerization of the controlled distribution block copolymer, providing an intimate mixture of said controlled distribution block copolymer and said tailored softening modifier.

2. The composition according to claim 1 wherein said mono alkenyl arene for the controlled distribution block copolymer and the softening modifier is styrene and said conjugated diene for the controlled distribution block copolymer and the softening modifier is selected from the group consisting of isoprene, 1,3-butadiene and mixtures thereof.

3. The composition according to claim 2 wherein said softening modifier has a molecular weight of between 2,000 and 100,000, a blockiness index of between about 1 percent and 80 percent, and a ratio of $I_2/I_1$ of between 0.1 and 2.0.

4. The composition according to claim 1 wherein said first solution and second solution are combined after polymerization of both the controlled distribution block copolymer and the tailored softening modifier, and prior to hydrogenation, and said common solution is hydrogenated.

5. The composition according to claim 1 wherein said first solution and second solution are combined after hydrogenation of both the controlled distribution block copolymer and the tailored softening modifier, and prior to finishing.

6. The composition according to claim 1 wherein said second solution is added to said first solution prior to polymerization of said controlled distribution block copolymer.

7. The composition according to claim 1 wherein said second solution is added to said first solution during the polymerization of said controlled distribution block copolymer.

8. A block copolymer composition comprising:
   (a) 100 parts by weight of a solid hydrogenated controlled distribution block copolymer having the general configuration A-B, A-B-A, (A-B)$_n$, (A-B-A)$_n$, (A-B-A)$_n$X, (A-B)$_n$X or mixtures thereof, where n is an integer from 2 to about 30, and X is coupling agent residue and wherein:
      i. prior to hydrogenation each A block is a mono alkenyl arene polymer block and each B block is a controlled distribution copolymer block of at least one conjugated diene and at least one mono alkenyl arene having a blockiness index ($I_1$) of less than about 40 percent;

ii. subsequent to hydrogenation about 0-10% of the arene double bonds have been reduced, and at least about 90% of the conjugated diene double bonds have been reduced;

iii. each A block having a peak molecular weight between about 3,000 and about 60,000 and each B block having a peak molecular weight ($MW_1$) between about 30,000 and about 300,000;

iv. each B block comprises terminal regions adjacent to the A blocks that are rich in conjugated diene units and one or more regions not adjacent to the A blocks that are rich in mono alkenyl arene units;

v. the total amount of mono alkenyl arene in the hydrogenated block copolymer is about 20 percent weight to about 80 percent weight; and vi. the weight percent of mono alkenyl arene in each B block ($S_1$) is between about 5 percent and about 75 percent; and (b) 5 to 250 parts by weight of a hydrogenated tailored softening modifier which is structurally related to the character of the B block of said controlled distribution block copolymer wherein:

i. said softening modifier contains at least one conjugated diene and at least one mono alkenyl arene having a blockiness index $I_2$, such that the ratio of $I_2/I_1$ is between 0.1 and 10.0;

ii. subsequent to hydrogenation about 0-10% of the arene double bonds have been reduced, and at least about 90% of the conjugated diene double bonds have been reduced;

iii. the ratio $(MW_2)/(MW_1)$ of the peak molecular weight of said softening modifier ($MW_2$) to the peak molecular weight of said B block of said controlled distribution block copolymer ($MW_1$) is 0.01 to 1.0, with a minimum molecular weight ($MW_2$) of 2,000;

iv. the weight percent of mono alkenyl arene in each softening modifier ($S_2$) is between about 5 percent and about 75 percent and the ratio of $S_2/S_1$ is between 0.5 and 1.5; and (c) wherein said controlled distribution block copolymer is formed in solution in a reactor in the presence of a solvent and said tailored softening modifier is formed in the same solution in the same reactor; and (d) the solvent is removed from the solution, providing an intimate mixture of said controlled distribution block copolymer and said tailored softening modifier.

9. The composition according to claim 8 wherein said mono alkenyl arene for the controlled distribution block copolymer and the softening modifier is styrene and said conjugated diene for the controlled distribution block copolymer and the softening modifier is selected from the group consisting of isoprene, 1,3-butadiene and mixtures thereof.

10. The composition according to claim 9 wherein said softening modifier has a molecular weight of between 2,000 and 100,000, a blockiness index of between about 1 percent and 80 percent, and a ratio of $I_2/I_1$ of between 0.1 and 2.0.

11. The composition according to claim 8 wherein said softening agent is polymerized prior to the polymerization of said controlled distribution block copolymer.

12. The composition according to claim 8 wherein said softening agent is polymerized during the polymerization of the B block of said controlled distribution block copolymer.

13. The composition according to claim 8 wherein said softening agent is polymerized after the polymerization of said controlled distribution block copolymer.

14. A block copolymer composition comprising:

(a) 100 parts by weight of a solid hydrogenated controlled distribution block copolymer having the general configuration A-B, A-B-A, $(A-B)_n$, $(A-B-A)_n$, $(A-B-A)_nX$, $(A-B)_nX$ or mixtures thereof, where n is an integer from 2 to about 30, and X is coupling agent residue and wherein:

i. prior to hydrogenation each A block is a mono alkenyl arene polymer block and each B block is a controlled distribution copolymer block of at least one conjugated diene and at least one mono alkenyl arene having a blockiness index ($I_1$) of less than about 40 percent;

ii. subsequent to hydrogenation about 0-10% of the arene double bonds have been reduced, and at least about 90% of the conjugated diene double bonds have been reduced;

iii. each A block having a peak molecular weight between about 3,000 and about 60,000 and each B block having a peak molecular weight ($MW_1$) between about 30,000 and about 300,000;

iv. each B block comprises terminal regions adjacent to the A blocks that are rich in conjugated diene units and one or more regions not adjacent to the A blocks that are rich in mono alkenyl arene units;

v. the total amount of mono alkenyl arene in the hydrogenated block copolymer is about 20 percent weight to about 80 percent weight; and vi. the weight percent of mono alkenyl arene in each B block ($S_1$) is between about 5 percent and about 75 percent; and (b) 5 to 250 parts by weight of a non-hydrogenated tailored softening modifier which is structurally related to the character of the B block of said controlled distribution block copolymer prior to hydrogenation of said B block wherein:

i. said softening modifier contains at least one conjugated diene and at least one mono alkenyl arene having a blockiness index $I_2$, such that the ratio of $I_2/I_1$ is between 0.1 and 10.0;

ii. the ratio $(MW_2)/(MW_1)$ of the peak molecular weight of said softening modifier ($MW_2$) to the peak molecular weight of said B block of said controlled distribution block copolymer ($MW_1$) is 0.01 to 1.0, with a minimum molecular weight ($MW_2$) of 2,000;

iii. the weight percent of mono alkenyl arene in each softening modifier ($S_2$) is between about 5 percent and about 75 percent and the ratio of $S_2/S_1$ is between 0.5 and 1.5; and (c) wherein said controlled distribution block copolymer is formed in solution in the presence of a solvent in a first reactor to form a first solution, where said block copolymer is hydrogenated and said softening modifier is formed in solution in the presence of a solvent in a second reactor to form a second solution, where said softening modifier is not hydrogenated;

(d) said first and second solutions are combined to form a common solution; and (e) the solvent is removed from the common solution, providing an intimate mixture of said controlled distribution block copolymer and said tailored softening modifier.

15. The composition according to claim 14 wherein said mono alkenyl arene for the controlled distribution block copolymer and the softening modifier is styrene and said conjugated diene for the controlled distribution block copolymer and the softening modifier is selected from the group consisting of isoprene, 1,3-butadiene and mixtures thereof.

16. The composition according to claim 15 wherein said softening modifier has a molecular weight of between 2,000 and 100,000, a blockiness index of between about 1 percent and 80 percent, and a ratio of $I_2/I_1$ of between 0.1 and 2.0.

17. The composition of claim 1 including at least one component selected from the group consisting of fillers, reinforcements, polymer extending oils, tackifying resins, lubricants, stabilizers, styrene polymers, antioxidants, styrene/diene block copolymers and polyolefins.

18. The composition of claim 8 including at least one component selected from the group consisting of fillers, reinforcements, polymer extending oils, tackifying resins, lubricants, stabilizers, styrene polymers, antioxidants, styrene/diene block copolymers and polyolefins.

19. A block copolymer composition comprising:
(a) 100 parts by weight of a solid hydrogenated controlled distribution block copolymer having the general configuration A-B, A-B-A, $(A-B)_n$, $(A-B-A)_n$, $(A-B-A)_nX$, $(A-B)_nX$ or mixtures thereof, where n is an integer from 2 to about 30, and X is coupling agent residue and wherein:
   i. prior to hydrogenation each A block is a mono alkenyl arene polymer block and each B block is a controlled distribution copolymer block of at least one conjugated diene and at least one mono alkenyl arene having a blockiness index ($I_1$) of less than about 40 percent;
   ii. subsequent to hydrogenation about 0-10% of the arene double bonds have been reduced, and at least about 90% of the conjugated diene double bonds have been reduced;
   iii. each A block having a peak molecular weight between about 3,000 and about 60,000 and each B block having a peak molecular weight ($MW_1$) between about 30,000 and about 300,000;
   iv. each B block comprises terminal regions adjacent to the A blocks that are rich in conjugated diene units and one or more regions not adjacent to the A blocks that are rich in mono alkenyl arene units;
   v. the total amount of mono alkenyl arene in the hydrogenated block copolymer is about 20 percent weight to about 80 percent weight; and
   vi. the weight percent of mono alkenyl arene in each B block ($S_1$) is between about 5 percent and about 75 percent; and (b) 5 to 250 parts by weight of a hydrogenated tailored softening modifier which is structurally related to the character of the B block of said controlled distribution block copolymer wherein:
   i. said softening modifier contains at least one conjugated diene and at least one mono alkenyl arene having a blockiness index $I_2$, such that the ratio of $I_2/I_1$ is between 0.1 and 10.0;
   ii. subsequent to hydrogenation about 0-10% of the arene double bonds have been reduced, and at least about 90% of the conjugated diene double bonds have been reduced;
   iii. the ratio $(MW_2)/(MW_1)$ of the peak molecular weight of said softening modifier ($MW_2$) to the peak molecular weight of said B block of said controlled distribution block copolymer ($MW_1$) is 0.01 to 1.0, with a minimum molecular weight ($MW_2$) of 2,000;
   iv. the weight percent of mono alkenyl arene in each softening modifier ($S_2$) is between about 5 percent and about 75 percent and the ratio of $S_2/S_1$ is between 0.5 and 1.5; and
(c) wherein said controlled distribution block copolymer is dissolved in the presence of a solvent in a first reactor to form a first solution and said softening modifier is polymerized in solution in the presence of a solvent in a second reactor to form a second solution;
(d) said first and second solutions are combined to form a common solution; and
(e) the solvent is removed from the common solution, providing an intimate mixture of said controlled distribution block copolymer and said tailored softening modifier.

20. The composition according to claim 4 wherein said common solution after hydrogenation is grafted with an acid compound or its derivative selected from the group consisting of maleic acid, maleic anhydride.

21. The composition according to claim 4 wherein said common solution after hydrogenated is grafted with sulfonic acid groups.

22. The composition of claim 17 including a thermoplastic polyurethane or a thermoplastic polyester elastomer.

23. The composition of claim 22 including a maleated S-EB-S copolymer.

24. The composition of claim 18 including a thermoplastic polyurethane or a thermoplastic polyester elastomer.

25. The composition of claim 24 including a maleated S-EB-S copolymer.

* * * * *